(12) United States Patent
Fuchigami et al.

(10) Patent No.: US 10,853,680 B2
(45) Date of Patent: Dec. 1, 2020

(54) IDENTIFICATION MEDIUM RECOGNITION DEVICE AND IDENTIFICATION MEDIUM RECOGNITION METHOD

(71) Applicant: PANASONIC INTELLECTUAL PROPERTY MANAGEMENT CO., LTD., Osaka (JP)

(72) Inventors: Ikuo Fuchigami, Fukuoka (JP); Masao Hamada, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 15/742,375

(22) PCT Filed: Jul. 4, 2016

(86) PCT No.: PCT/JP2016/003183
§ 371 (c)(1),
(2) Date: Jan. 5, 2018

(87) PCT Pub. No.: WO2017/010058
PCT Pub. Date: Jan. 19, 2017

(65) Prior Publication Data
US 2018/0189590 A1    Jul. 5, 2018

(30) Foreign Application Priority Data

Jul. 14, 2015 (JP) ................................ 2015-140393
Feb. 1, 2016 (JP) ................................ 2016-017385
Jun. 8, 2016 (JP) ................................ 2016-114315

(51) Int. Cl.
*G06K 9/00* (2006.01)
*G06K 9/32* (2006.01)
(Continued)

(52) U.S. Cl.
CPC ......... *G06K 9/325* (2013.01); *G06K 9/00798* (2013.01); *G06K 9/3258* (2013.01);
(Continued)

(58) Field of Classification Search
CPC ......... G06K 2009/363; G06K 2209/15; G06K 9/00798; G06K 9/325; G06K 9/3258; G06T 3/4053
See application file for complete search history.

(56) References Cited

U.S. PATENT DOCUMENTS 9,609,181 B2    3/2017  Wang et al.
2012/0051667 A1*  3/2012  Kang .................... G06T 3/4053
                                                           382/299
(Continued)

FOREIGN PATENT DOCUMENTS

JP    64-074700    3/1989
JP    10-063786    3/1998
(Continued)

OTHER PUBLICATIONS

Google_Scholar_Search.*
(Continued)

*Primary Examiner* — Xin Jia
(74) *Attorney, Agent, or Firm* — Greenblum & Berstein, P.L.C.

(57) ABSTRACT

Identification medium recognition device (3) includes image input (11) that acquires a captured image imaged by an imaging device, identification medium region detector (12) that detects a region of the identification medium from the captured image, identification medium recognizer (18) that recognizes the character and/or the numeric character included in the identification medium from the region of the identification medium, super-resolution processor (17) that selectively performs super-resolution processing of the
(Continued)

region of the identification medium, region storage (14) that stores a preset region in the captured image, identification medium region determiner (13) that determines whether the region of the identification medium is positioned within the preset region, and super-resolution processing selector (16) that selects, in a case where it is determined that the region of the identification medium is positioned within the preset region, execution of super-resolution processing by the super-resolution processor.

17 Claims, 20 Drawing Sheets

(51) Int. Cl.
     *G06T 3/40*      (2006.01)
     *G06K 9/36*      (2006.01)

(52) U.S. Cl.
     CPC ...... *G06T 3/4053* (2013.01); *G06K 2009/363* (2013.01); *G06K 2209/15* (2013.01)

(56) References Cited

U.S. PATENT DOCUMENTS

| | | |
|---|---|---|
| 2012/0213452 A1 | 8/2012 | Matsuyama et al. |
| 2015/0125042 A1* | 5/2015 | Haden ............... G06K 9/00771 382/105 |
| 2016/0035037 A1* | 2/2016 | Bulan .................. G06Q 40/08 705/4 |

FOREIGN PATENT DOCUMENTS

| | | |
|---|---|---|
| JP | 2008-251029 | 10/2008 |
| JP | 2012-063869 | 3/2012 |
| JP | 2014-006854 | 1/2014 |
| JP | 2014-238636 | 12/2014 |

OTHER PUBLICATIONS

International Search Report (ISR) from International Searching Authority (Japan Patent Office) in International Pat. Appl. No. PCT/JP2016/003183, dated Sep. 27, 2016.

* cited by examiner

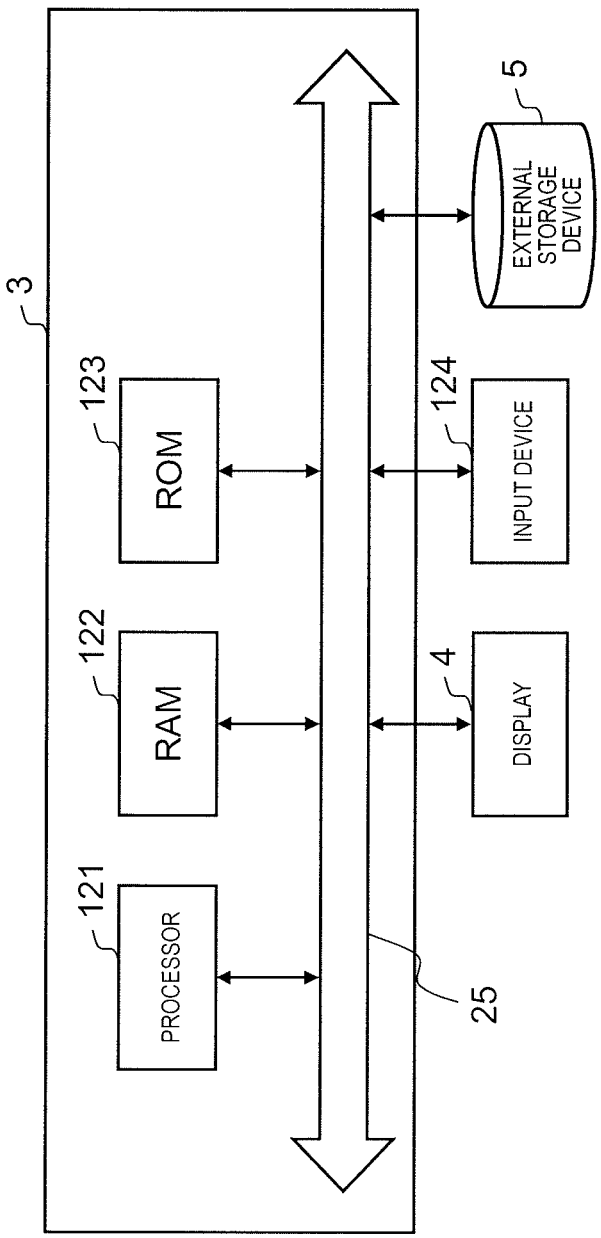

FIG. 12

| SERIES DESIGNATION NUMBER | CORRELATION VALUE |
|---|---|
| 1 | 0.045500 |
| 2 | -0.037740 |
| 3 | 0.060702 |
| 4 | -0.121705 |
| 5 | 0.092958 |
| 6 | 0.057832 |
| 7 | 0.118044 |
| 8 | 0.139041 |
| 9 | 0.160467 |
| 10 | -0.152983 |
| 11 | 0.118320 |
| . | |
| . | |
| 5774 | 0.268559 |
| 5775 | 0.399328 |
| 5776 | 0.323920 |
| . | |
| . | |
| 9997 | 0.155330 |
| 9998 | -0.191643 |
| 9999 | -0.203805 |

FIG. 13

| ORDER | SERIES DESIGNATION NUMBER | CORRELATION VALUE |
|---|---|---|
| 1 | 5 7 7 5 | 0.3993 |
| 2 | 5 7 2 5 | 0.3575 |
| 3 | 5 7 1 5 | 0.3537 |
| 4 | 5 3 7 5 | 0.3534 |
| 5 | 9 7 7 5 | 0.3525 |
| 6 | 6 7 7 5 | 0.3493 |
| 7 | 3 7 7 5 | 0.3473 |
| 8 | 9 7 2 5 | 0.3401 |
| ⋮ | ⋮ | |
| 77 | 5 1 7 5 | 0.3007 |
| 78 | 8 3 1 5 | 0.3 |
| 79 | 5 7 7 7 | 0.3009 |
| 80 | 5 0 2 5 | 0.2985 |

| NUMERIC CHARACTER | 4 DIGITS | 3 DIGITS | 2 DIGITS | 1 DIGIT |
|---|---|---|---|---|
| 0 | 0.0000 | 0.0076 | 0.0075 | 0.0038 |
| 1 | 0.0038 | 0.0037 | 0.0550 | 0.0000 |
| 2 | 0.0000 | 0.0315 | 0.0671 | 0.0000 |
| 3 | 0.0356 | 0.0710 | 0.0077 | 0.0231 |
| 4 | 0.0039 | 0.0000 | 0.0038 | 0.0000 |
| 5 | *0.1354 | 0.0038 | 0.0040 | *0.2617 |
| 6 | 0.0472 | 0.0000 | 0.0000 | 0.0078 |
| 7 | 0.0000 | *0.1560 | *0.1554 | 0.0037 |
| 8 | 0.0235 | 0.0309 | 0.0077 | 0.0039 |
| 9 | 0.0551 | 0.0115 | 0.0078 | 0.0119 |
| . | 0.0114 | 0.0000 | 0.0000 | 0.0000 |

FIG. 18

| SERIES DESIGNATION NUMBER UPPER 2 DIGITS | CORRELATION VALUE |
|---|---|
| ·· | 0.201 |
| ·1 | 0.139 |
| ·2 | 0.206 |
| ·3 | 0.130 |
| · | |
| · | |
| 56 | 0.229 |
| 57 | 0.314 |
| 58 | 0.212 |
| · | |
| · | |
| 98 | 0.180 |
| 99 | 0.188 |

FIG. 19

| SERIES DESIGNATION NUMBER UPPER 2 DIGITS | CORRELATION VALUE |
|:---:|:---:|
| ·1 | 0.129 |
| ·2 | 0.112 |
| ·3 | 0.108 |
| · | |
| · | |
| 74 | 0.160 |
| 75 | 0.327 |
| 76 | 0.175 |
| · | |
| · | |
| 99 | 0.254 |
| 00 | 0.191 |
| 01 | 0.130 |
| · | |
| · | |
| 08 | -0.185 |
| 09 | -0.227 |

FIG. 20

| NUMERIC CHARACTER | 2 DIGITS | 1 DIGIT |
| --- | --- | --- |
| 0 | 0.156 | 0.096 |
| 1 | 0.117 | 0.192 |
| 2 | 0.068 | 0.213 |
| 3 | 0.175 | 0.080 |
| 4 | 0.096 | 0.016 |
| 5 | *0.233 | 0.119 |
| 6 | 0.066 | 0.062 |
| 7 | 0.097 | *0.237 |
| 8 | 0.167 | 0.124 |
| 9 | 0.172 | 0.119 |
| . | 0.096 | 0.118 |
| . | | |

IDENTIFICATION MEDIUM RECOGNITION DEVICE AND IDENTIFICATION MEDIUM RECOGNITION METHOD

TECHNICAL FIELD

The present disclosure relates to an identification medium recognition device and an identification medium recognition method for recognizing a character and/or a numeric character included in an identification medium such as a car license plate or an ID card.

BACKGROUND ART

A technology for reading a license plate from a vehicle image imaged by a camera installed on roads and entrances of facilities is spreading for a purpose of enhancing a security environment and managing customers. For example, in an automobile number automatic reading device installed on a main road or the like, it is possible to read the license plate of a vehicle traveling on a roadway in a predetermined direction. A technology for imaging an identification medium such as the license plate of the vehicle or an ID card on which a character or a numeric character is written, correcting a geometric distortion of a captured image caused by an imaging angle, and subsequently reading the character or the numeric character of the identification medium from the captured image is known (for example, see PTL 1 and PTL 2). In the technology disclosed in PTL 1, a size of the identification medium (the license plate of the vehicle) on an image is specified, and distortion correction is performed using a parameter suitable for the specified size. In addition, in the technology disclosed in PTL 2, the distortion correction of an identification medium image having a larger geometric distortion imaged at a short distance is performed using the identification medium image (license plate image) with a smaller geometric distortion imaged at a long distance as a reference image.

In order to correct the distortion, it is necessary that a region size of the identification medium image has a certain size. Accordingly, it is necessary to use the identification medium image imaged at the short distance. That is, since the region size of the identification medium image imaged at the long distance is small, it is difficult to perform recognition processing. In order to be able to recognize both of the identification medium image imaged at the short distance and the identification medium image imaged at the long distance, it is considered to perform super-resolution processing of the imaged identification medium image. However, in this case, there is a problem in that a processing load of the device becomes greater.

On the other hand, even in a case of a device specialized for reading the identification medium, a clear captured image cannot be obtained due to changes in an imaging condition such as bad weather or dirt on a camera lens, in some cases. In addition, the captured image suitable for recognizing the identification medium cannot always be obtained by a surveillance camera installed at a shop or a street depending on a resolution or imaging conditions (a size of the identification medium in the captured image, an imaging angle, and the like) of a camera, in some cases.

A technology for suppressing erroneous recognition (misreading) of a character string in the identification medium image even in a case of the captured image suitable for recognizing such an identification medium has been developed. For example, a technology for calculating a correlation value between a character in the identification medium image and a verification-purpose character pattern, and recognizing a character only in a case where the correlation value is equal to or greater than a certain value is known (see PTL 3).

In addition, a technology for comparing an image pattern imaged by a camera with a plurality of dictionary patterns stored in advance, calculating a similarity for each dictionary pattern, calculating a correction similarity which is obtained by correcting the similarity based on an appearance frequency for each dictionary pattern stored in advance, and determining the dictionary pattern having the highest degree of matching similarity is known (see PTL 4).

However, in a case where a character string (such as a plurality of a series of numeric characters or characters) such as a series of designation number is described in the identification medium, and the character string is recognized, there is a problem in that by simply evaluating the similarity between the enter character string and a verification-purpose pattern, the similarity between individual numeric character or character which configures the character string or individual numeric character or character included in the verification-purpose pattern is not appropriately reflected.

An object of the present disclosure is to recognize both the identification medium image imaged at the long distance and the identification medium image imaged at the short distance without increasing a processing load of the device. Furthermore, an object of the present disclosure is to reduce erroneous recognition of a character string in the imaged identification medium image.

CITATION LIST

Patent Literature

PTL 1: Japanese Patent Unexamined Publication No. 2014-006854

PTL 2: Japanese Patent Unexamined Publication No. 2012-063869

PTL 3: Japanese Patent Unexamined Publication No. 64-74700

PTL 4: Japanese Patent Unexamined Publication No. 10-63786

SUMMARY OF THE INVENTION

An identification medium recognition device for recognizing a character and/or a numeric character included in an identification medium of the present disclosure includes an image input that acquires a captured image imaged by an imaging device, an identification medium region detector that detects a region of the identification medium from the captured image, an identification medium recognizer that recognizes the character and/or the numeric character included in the identification medium from the region of the identification medium, a super-resolution processor that selectively performs super-resolution processing of the region of the identification medium, a region storage that stores a preset region in the captured image, an identification medium region determiner that determines whether the region of the identification medium is positioned within the preset region, and a super-resolution processing selector that selects, in a case where it is determined that the region of the identification medium is positioned within the preset region, execution of super-resolution processing by the super-resolution processor.

Furthermore, an identification medium recognition device for recognizing a character and/or a numeric character included in an identification medium of the present disclosure includes an image input that acquires a captured image imaged by an imaging device, an identification medium region detector that detects a region of the identification medium from the captured image, an identification medium recognizer that recognizes the character and/or the numeric character included in the identification medium from the region of the identification medium, a super-resolution processor that selectively performs super-resolution processing of the region of the identification medium, a region parameter calculator that calculates at least one of a region size of the region of the identification medium and a distortion degree which is a value indicating a geometric distortion degree, and a super-resolution processing selector that selects execution and non-execution of super-resolution processing by the super-resolution processor based on at least one of the region size and a distortion degree of the region of the identification medium.

Furthermore, the identification medium recognition device of the present disclosure includes a processor that executes processing of recognizing a character string in a captured identification medium image, in which the character string is configured of a plurality of characters, in which an arrangement order from 1 to x (where, x is an integer of 2 or more) is set according to positions or relative positions between the characters in the identification medium image, and the processor calculates similarities between the character string in the identification medium image and a plurality of preset reference images, respectively, calculates, for a reference character in each of the plurality of the reference images corresponding to 1 or y (where, y is an integer of 2 or more and smaller than x) characters in the arrangement order to be evaluated in the character string, an evaluation value including a sum of the similarities for each of the reference images in which the reference character is the same, and determines at least one character candidate that can configure the character string in the identification medium image based on the evaluation value.

An identification medium recognition method of the present disclosure for recognizing a character and/or a numeric character included in an identification medium includes an image acquiring step of acquiring a captured image imaged by an imaging device, an identification medium region detecting step of detecting a region of the identification medium from the captured image, an identification medium recognizing step of recognizing the character and/or the numeric character included in the identification medium from the region of the identification medium, a super-resolution processing step of performing selectively super-resolution processing of the region of the identification medium, a region storing step of storing a preset region in the captured image, an identification medium region determining step of determining the region of the identification medium is positioned within the preset region, and a super-resolution processing selecting step of selecting, in a case where it is determined that the region of the identification medium is positioned within the preset region, execution of super-resolution processing step.

Furthermore, an identification medium recognition method for recognizing a character and/or a numeric character included in an identification medium of the present disclosure includes an image acquiring step of acquiring a captured image imaged by an imaging device, an identification region detecting step of detecting a region of the identification medium from the captured image, an identification medium recognizing step of recognizing the character and/or the numeric character included in the identification medium from the region of the identification medium, a super-resolution processing step of selectively performing super-resolution processing of the region of the identification medium, a region parameter calculating step of calculating at least one of a region size of the region of the identification medium and a distortion degree which is a value indicating a geometric distortion degree, and a super-resolution processing selecting step of selecting execution and non-execution of super-resolution processing step based on at least one of the region size and the distortion degree of the region of the identification medium.

An identification medium recognition method by an identification medium recognition device for executing processing of recognizing a character string in a captured identification medium image of a vehicle of the present disclosure, in which the character string is configured of a plurality of characters, in which an arrangement order from 1 to x (where, x is an integer of 2 or more) is set according to positions or relative positions between the characters in the identification medium image. The method includes calculating similarities between the character string in the identification medium image and preset reference image, respectively, calculating, for a reference character in each of a plurality of reference images corresponding to 1 or y (where, y is an integer of 2 or more and smaller than x) characters in the arrangement order to be evaluated in the character string, an evaluation value including a sum of the similarities for each of the reference images in which the reference character is the same, and determining, based on the evaluation value, at least one character candidate that can configure the character string in the identification medium image.

According to the present disclosure, both the identification medium image imaged at the long distance and the identification medium image imaged at the short distance can be recognized without increasing a processing load of the device. Furthermore, according to the present disclosure, erroneous recognition of a character string in the imaged license plate image of the vehicle can be reduced.

BRIEF DESCRIPTION OF DRAWINGS

FIG. 1B is a block diagram illustrating a hardware configuration of an identification medium recognition device illustrated in FIG. 1A.

FIG. 12 is a diagram illustrating an example of a calculation result by a similarity calculator in FIG. 11.

FIG. 13 is a diagram illustrating an example of extraction of a high-order candidate of a correlation value by a similarity evaluator in FIG. 11.

FIG. 14 is a diagram illustrating an example of an evaluation value calculation result of each digit by the similarity evaluator in FIG. 11.

FIG. 18 is a diagram illustrating an example (upper two digits) of a calculation result by a similarity calculator of an identification medium recognition device according to a sixth exemplary embodiment.

FIG. 19 is a diagram illustrating an example (lower two digits) of the calculation result by the similarity calculator of the identification medium recognition device according to the sixth exemplary embodiment.

FIG. 20 is a diagram illustrating an example of the result of calculation of each digit of the evaluation value by the similarity evaluator of the identification medium recognition device according to the sixth exemplary embodiment.

DESCRIPTION OF EMBODIMENTS

Hereinafter, an exemplary embodiment (hereinafter referred to as "present exemplary embodiment") in which an identification medium recognition device and an identification medium recognition method according to the present disclosure are specifically disclosed will be described in detail with reference to the drawings as appropriate. However, unnecessarily detailed description may be omitted. For example, detailed description of well-known techniques or description of the substantially same elements may be omitted. Such omission is intended to prevent the following description from being unnecessarily redundant and to help those skilled in the art easily understand it. The inventor provides the following description and the attached drawings to enable those skilled in the art to fully understand the present disclosure. Thus, the description and the drawings are not intended to limit the scope of the subject matter defined in the claims. In the present specification, a plate, a card, and the like in which a character or a numeric character that can be imaged by an imaging device are written, such as a license plate of a vehicle, or an ID card, will be referred to as an "identification medium". The characters include hiragana, katakana, kanji, alphabet, and the like. Incidentally, a shape of the identification medium is not limited to a plate or a card shape. For example, the identification medium may be a label attached to a surface of an object to be identified such as a helmet, a printed matter in a form of a seal, a display object directly printed on the surface of the identification object, or the like. In addition, the characters or numeric characters of the identification medium are not limited to the printed characters or numeric characters, and may be handwritten characters or numeric characters.

Figure 1A:
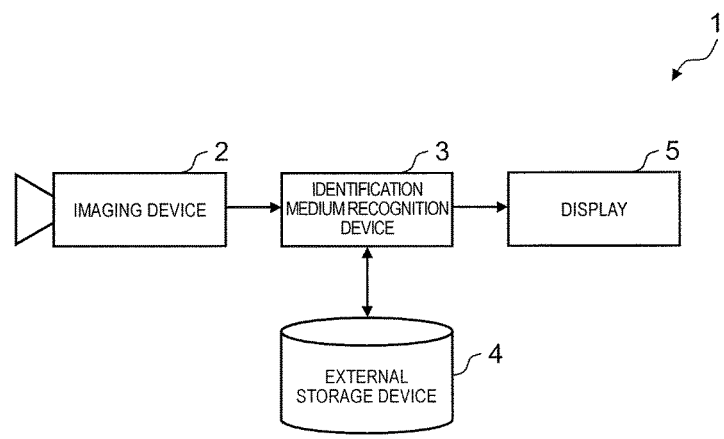
FIG. 1A is a schematic configuration diagram illustrating an identification medium recognition system according to an embodiment of the present disclosure.

FIG. 1A is a schematic configuration diagram illustrating identification medium recognition system 1 according to an embodiment of the present disclosure. FIG. 1B is a block diagram illustrating a hardware configuration of identification medium recognition device 3 illustrated in FIG. 1A. Identification medium recognition system 1 is, for example, a system for imaging and reading a license plate of a vehicle or the like. As illustrated in FIGS. 1A and 1B, identification medium recognition system 1 is configured by including imaging device 2, identification medium recognition device 3, external storage device 4, and display 5. For example, in a case where identification medium recognition system 1 as illustrated in FIGS. 1A and 1B is the system for recognizing a character string in the identification medium image obtained by imaging the license plate of the vehicle or the like as an identification medium, identification medium recognition system 1 includes imaging device 2 that images the vehicle or the like including the identification medium, identification medium recognition device 3 that executes recognition processing of the character string in the identification medium image obtained by imaging device 2, external storage device 4 that stores various types of data items relating to processing of identification medium recognition device 3, and display 5 that displays the identification medium image imaged by imaging device 2 or a processing result of identification medium recognition device 3, or the like.

Imaging device 2 is a digital still camera or a digital video camera including an image sensor such as a CCD or the like, and images the license plate of the vehicle traveling on a roadway. The captured image includes not only an identification medium (license plate) as a main subject but also a vehicle body, surrounding objects, and the like. Imaging device 2 may be disposed at an entrance of the facility, on a side or above the roadway, or on a vehicle such as a police vehicle. In a case where imaging device 2 is disposed on the side of the roadway, imaging device 2 may be attached to a roadside camera post installed on the road side of the roadway. In addition, in a case where imaging device 2 is disposed above the roadway, imaging device 2 mat be attached to a cantilevered camera post configured to protrude upward from the roadway side of the roadway or a portal type camera post configured to straddle the roadway. When mounted on a vehicle, imaging device 2 may image the license plate of a vehicle while the vehicle with imaging device 2 mounted thereon is stopped on a shoulder of the roadway. The image (captured image) imaged by imaging device 2 is input to identification medium recognition device 3.

Identification medium recognition device 3 is configured of a CPU, a RAM, a ROM, a network interface, or the like. Identification medium recognition device 3 extracts the region of the identification medium from the captured image input from imaging device 2, and reads out the identification medium by recognizing the character and/or the numeric character included in the region of the identification medium. As illustrated in FIG. 1B, in identification medium recognition device 3, processor 121 that comprehensively executes processing for recognizing the character string in the identification medium image based on a predetermined control program, random access memory (RAM) 122 that is a volatile memory functioning as a work region or the like of processor 121, and read only memory (ROM) 123 that is a nonvolatile memory for storing the control program executed by processor 121 or data are connected to input and output bus 125, respectively. In addition, in identification medium recognition device 3, input device 124 that is an input device such as a keyboard and a mouse, display 5 that is a monitor such as a liquid crystal, external storage device 4 that is a storage such as a hard disk drive (HDD) and a flash memory, and the like are connected as peripheral devices. In functional block diagrams of FIG. 2, FIG. 5, and FIG. 11 to be described later, the function of each part of identification medium recognition device 3 can be realized mainly by processor 121 executing the control program.

External storage device 4 is, for example, a hard disk drive (HDD) device, and display 5 is, for example, a monitor device. External storage device 4 and display 5 are connected to identification medium recognition device 3. The image imaged by imaging device 2 and the identification medium read out by identification medium recognition device 3 are stored in external storage device 4. In addition, the image imaged by imaging device 2 and the identification medium read out by identification medium recognition device 3 are displayed on display 5. The identification medium image may have a configuration in which the identification medium image is temporarily stored in the memory in imaging device 2 without being sent directly to identification medium recognition device 3.

A connection form between identification medium recognition device 3, imaging device 2, external storage device 4, and display 5 is not particularly limited, and may be, for example, a connection through wired or wireless communication such as a local area network (LAN), and a connection through a communication network such as the Internet. In addition, imaging device 2 and identification medium recognition device 3 may be integrally configured as the imaging device having an identification medium recognition function. In this case, it may be configured so as to output to external storage device 4 and display 5 through an output interface. In addition, a recording medium may be used by instead of external storage device 4.

First Exemplary Embodiment

Figure 2:
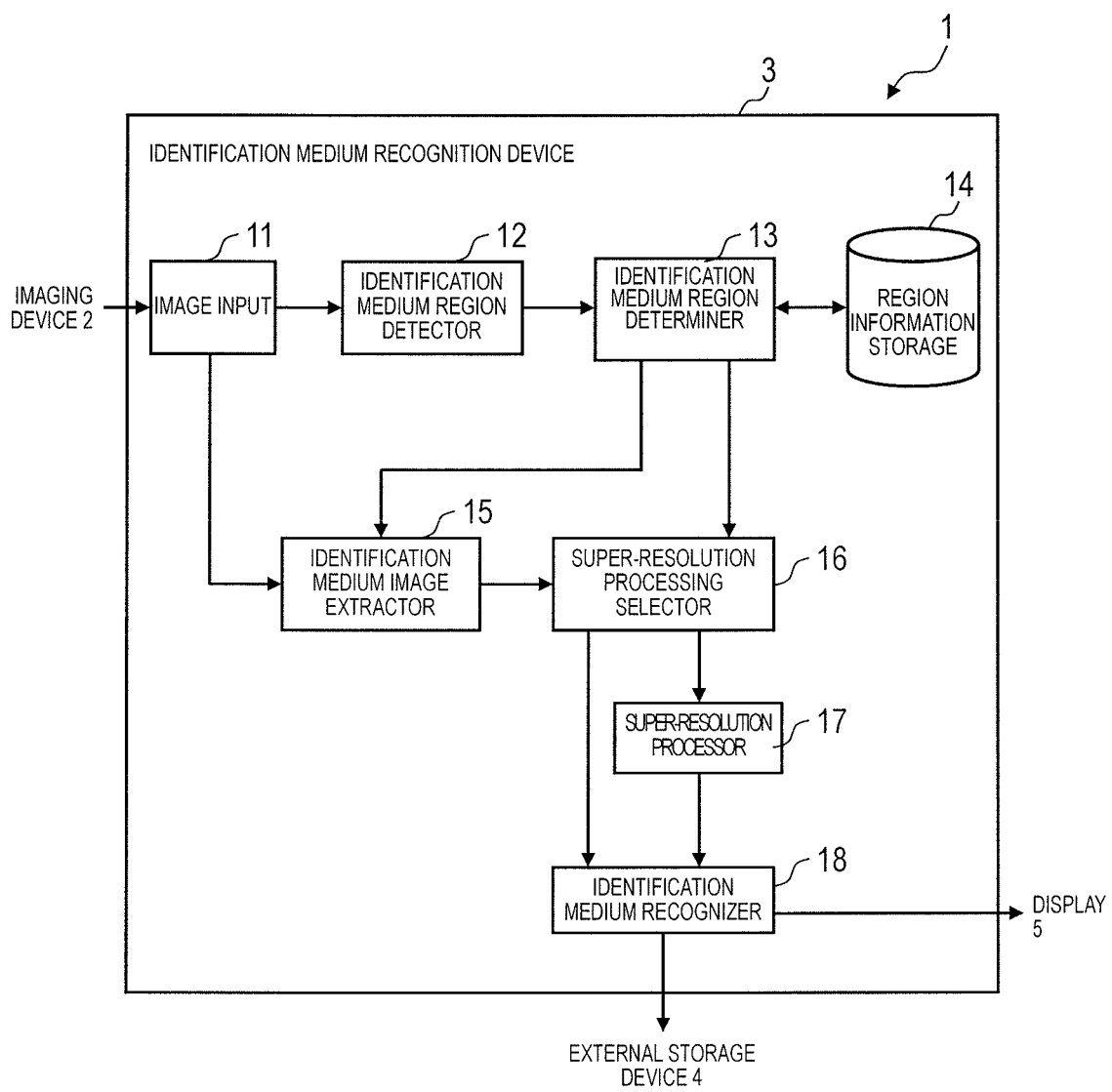
FIG. 2 is a block diagram illustrating a schematic configuration of the identification medium recognition device according to a first exemplary embodiment of the present disclosure.

Next, regarding the identification medium recognition device according to a first exemplary embodiment of the present disclosure will be described using the license plate as an example of the identification medium. Identification medium recognition system 1 according to the first exemplary embodiment of the present disclosure has the same function as identification medium recognition system 1 illustrated in FIG. 1A and FIG. 1B described above. FIG. 2 is a block diagram illustrating a schematic configuration of the identification medium recognition device according to the first exemplary embodiment of the present disclosure.

Figure 3:
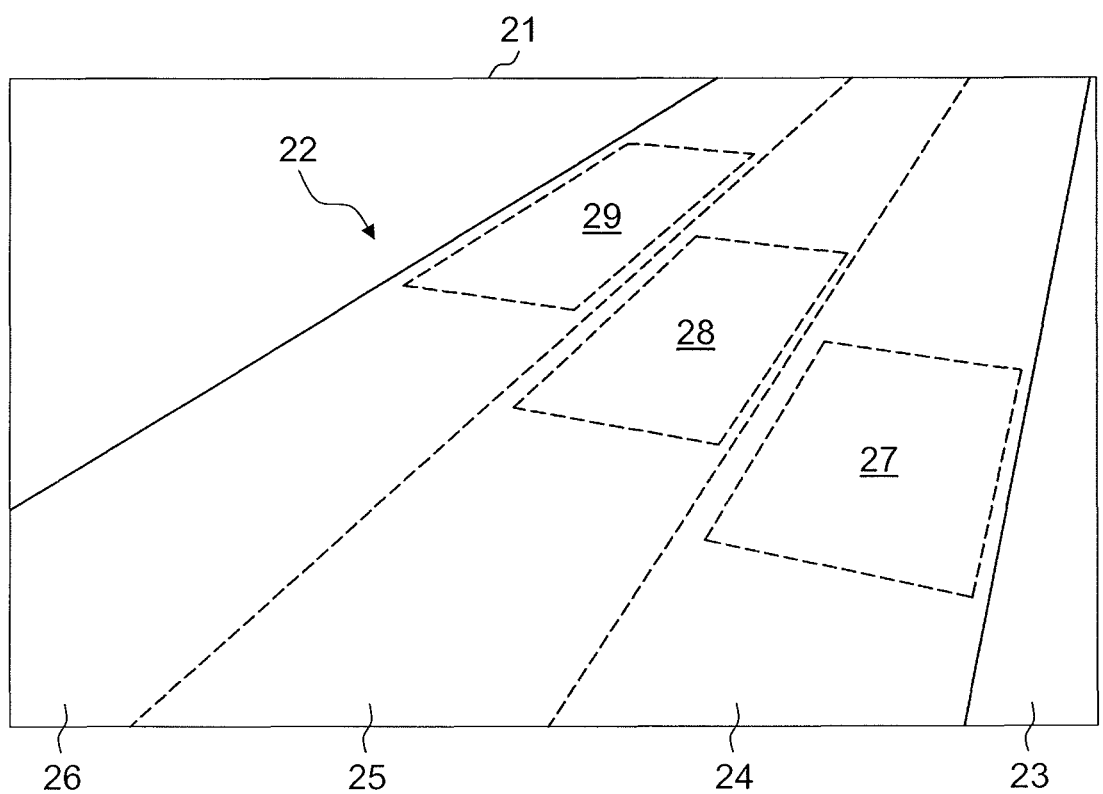
FIG. 3 is a diagram illustrating an example of a captured image imaged by an imaging device.
Figure 4:
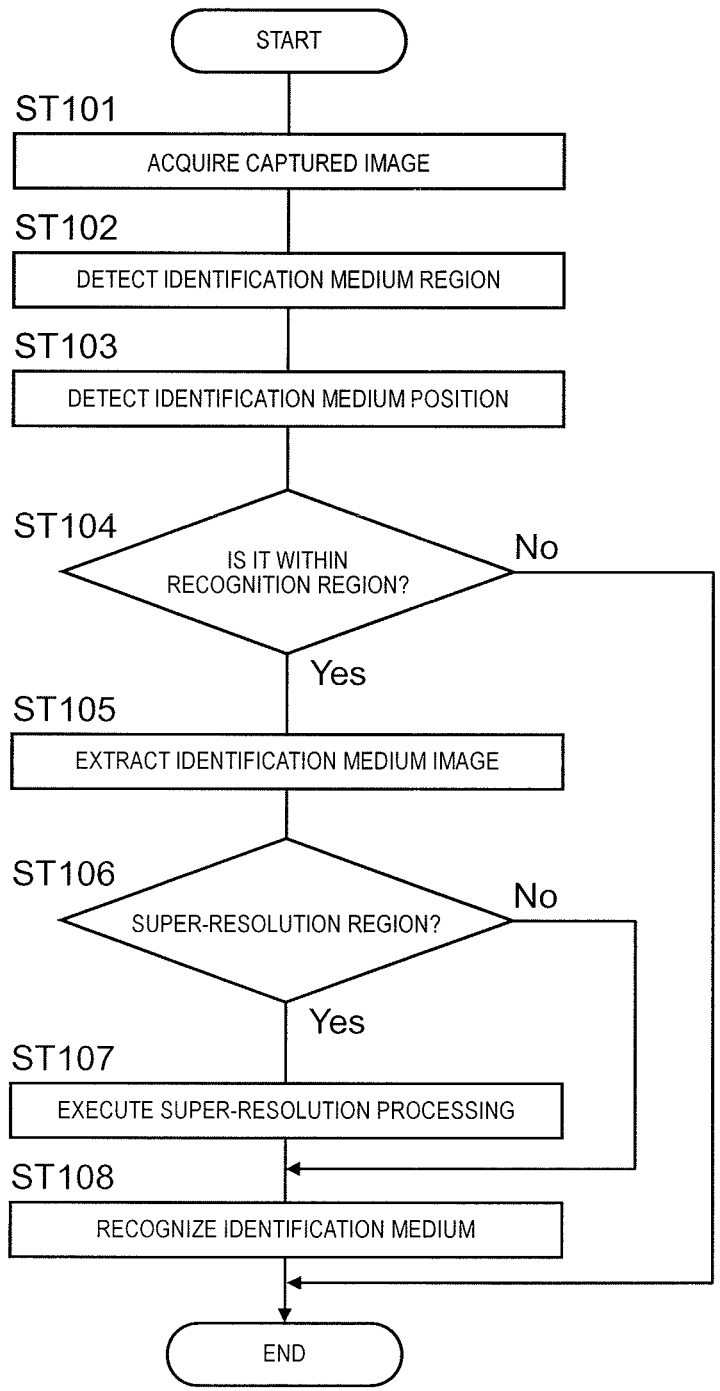
FIG. 4 is a flowchart illustrating a flow of identification medium recognition processing by the identification medium recognition device according to the first exemplary embodiment of the present disclosure.

FIG. 3 is a diagram illustrating an example of a captured image imaged by an imaging device. FIG. 4 is a flowchart illustrating a flow of identification medium recognition processing by the identification medium recognition device according to the first exemplary embodiment of the present disclosure.

As illustrated in FIG. 2, identification medium recognition device 3 according to the first exemplary embodiment of the present disclosure includes image input 11, identification medium region detector 12, identification medium region determiner 13, region information storage 14, identification medium image extractor 15, super-resolution processing selector 16, super-resolution processor 17, and identification medium recognizer 18.

Image input 11 acquires captured image 21 imaged by imaging device 2 (see FIG. 3). Captured image 21 on FIG. 3 is the captured image imaged by imaging device 2 disposed in a roadside strip of roadway 22 or walkway 23. Roadway 22 is a one-way three-lanes road, and the vehicle travels from a back side (upper side in the drawing) to a front side (lower side in the drawing) in the drawing. Three lanes of roadway 22 will be referred to as first driving lane 24, second driving lane 25, and third driving lane 26 in order from a shoulder side (right side in the drawing). Region 27 is set on first driving lane 24, region 28 is set on second driving lane 25, and region 29 is set on third driving lane 26. Regions 27, 28, and 29 are recognition regions to be described later. The captured image acquired by image input 11 is input to identification medium region detector 12 and identification medium image extractor 15.

Identification medium region detector 12 detects the region of the identification medium (hereinafter, simply referred to as an "identification medium region") from the captured image using an image recognition technology. The identification medium region detected by identification medium region detector 12 is input to identification medium region determiner 13. In a case where the identification medium region is not detected, the identification medium recognition processing by identification medium recognition device 3 is ended.

Identification medium region determiner 13 determines whether the position of the identification medium region in the captured image is within the region where the recognition processing of the identification medium is executed (hereinafter, referred to as a "recognition region") in the captured image. The determination is performed by referring to information on the recognition region stored in region information storage 14. The information on the recognition region is preset by a user or the like, and stored in region information storage 14.

In addition, the recognition region is divided into a region requiring super-resolution processing and a region not requiring super-resolution processing. The region requiring the super-resolution processing corresponds to the "preset region in the captured image" in the claims. The region not requiring the super-resolution processing is preset by the user and stored in region information storage 14. In a case where it is determined that the identification medium position is positioned within the recognition region, identification medium region determiner 13 determines whether the recognition region is the region requiring the super-resolution processing or the region not requiring the super-resolution processing.

In captured image 21 illustrated in FIG. 3, region 27 on first driving lane 24, region 28 on second driving lane 25, and region 29 on third driving lane 26 are the recognition regions. Region 27 and region 28 are regions not requiring the super-resolution processing, and region 29 is the region requiring the super-resolution processing. As described above, in order to recognize the identification medium, it is necessary that the region size of the identification medium image has a certain size. Therefore, it is desirable that the identification medium is imaged at a short distance. In addition, if a geometric distortion of the identification medium image is large, it becomes impossible to recognize the identification medium. Therefore, it is necessary that the identification medium image has a small geometric distortion. Since the distance between first driving lane 24 and second driving lane 25 is close to that of imaging device 2, the geometric distortion of the identification medium image imaged at the short distance in first driving lane 24 and second driving lane 25 becomes small (that is, it is suitable for image recognition). Accordingly, region 27 on first driving lane 24 and region 28 on second driving lane 25 where the identification medium is imaged at the short distance become the regions not requiring the super-resolution processing. Since the distance between third driving lane 26 and imaging device 2 is long, the identification medium image imaged at the short distance in third driving lane 26 has a large geometric distortion (that is, it is not suitable for image recognition). On the other hand, the identification medium image imaged at the long distance in third driving lane 26 has a relatively small geometric distortion (that is, it is suitable for image recognition). However, since the identification medium image imaged at the long distance in third driving lane 26 has a small region size, the execution of the super-resolution processing is required. Accordingly, region 29 on third driving lane 26 where the identification medium is imaged at the long distance becomes the region requiring the super-resolution processing.

The determination result of identification medium region determiner 13, that is, the information on region requiring the super-resolution processing and the region not requiring the super-resolution processing is input to super-resolution processing selector 16. In addition, in a case where it is determined that the identification medium position is positioned within the recognition region, identification medium region determiner 13 instructs identification medium image extractor 15 to extract the identification medium image from the captured image. In a case where it is determined that the identification medium position is not positioned within the recognition region, the identification medium recognition processing by identification medium recognition device 3 is ended.

When identification medium image extractor 15 receives a command to extract the identification medium image from the captured image from identification medium region determiner 13, the image of the identification medium region (hereinafter, referred to as the "identification medium image") is extracted from the captured image. Specifically, the identification medium image having a region size (image size) suitable for recognition processing to be described or the like is cut out from the captured image. The extracted identification medium image is input to super-resolution processing selector 16.

Super-resolution processing selector 16 selects execution and non-execution of the super-resolution processing based on the determination result, that is, the information on the region requiring the super-resolution processing and the region not requiring the super-resolution processing received from identification medium region determiner 13. Specifically, in a case where the identification medium region is positioned within the region requiring the super-resolution processing (region 29 in FIG. 3), super-resolution processing selector 16 selects the execution of the super-resolution processing. On the other hand, in a case where the identification medium region is positioned within the region not requiring the super-resolution processing (regions 27 and 28 in FIG. 3), super-resolution processing selector 16 selects the non-execution of the super-resolution processing. In a case where the execution of the super-resolution processing is selected, the identification medium image is input to super-resolution processor 17. In a case where the non-execution of the super-resolution processing is selected, the identification medium image is input to identification medium recognizer 18.

Super-resolution processor 17 performs super-resolution processing for increasing a resolution of the identification medium image. The identification medium image in which the super-resolution processing is performed is input to identification medium recognizer 18. In the present disclosure, since the region requiring the super-resolution processing in the captured image is preset, the region size (image size) or a degree of geometric distortion of the identification medium image is limited. That is, the character size or a geometric distortion pattern of the identification medium image is limited. Accordingly, since the pattern of a templet image (reference image) to be used for a templet type super-resolution processing technology, a data size can be reduced. As a result, it is possible to increase a processing speed.

Identification medium recognizer 18 recognizes the character and/or the numeric character included in the identification medium from the identification medium image in which the super-resolution processing input from super-resolution processing selector 16 is not performed, or the identification medium image in which the super-resolution processing input from super-resolution processor 17 is performed to readout the identification medium. The identification medium read out by identification medium recognizer 18 is stored in external storage device 4 or displayed on display 5.

Next, a flow of the identification medium recognition processing by identification medium recognition device 3 according to the first exemplary embodiment illustrated in FIG. 2 will be described with reference to FIG. 4.

First, image input 11 acquires the captured image imaged by imaging device 2 (ST101). Subsequently, identification medium region detector 12 detects the identification medium region from the captured image (ST102). Next, identification medium region detector 12 detects the position of the identification medium region in the captured image (ST103).

In the following step ST104, identification medium region determiner 13 determines whether the identification medium region is positioned within the region (recognition region) where the recognition processing of the identification medium is executed. In addition, in a case where it is determined that the identification medium region is positioned within the recognition region, identification medium region determiner 13 determines whether the recognition region is the region requiring the super-resolution processing or the region not requiring the super-resolution processing.

In step ST104, in a case where it is determined that the identification medium region is positioned within the recognition region (ST104: Yes), the processing proceeds to step ST105. In a case where it is determined that the identification medium region is not positioned within the recognition region (ST104: No), the processing is terminated.

In step ST105, identification medium image extractor 15 extracts the image of the identification medium region (identification medium image) from the captured image. In the following step ST106, super-resolution processing selector 16 selects the execution and non-execution of the super-resolution processing based on the information on the region requiring the super-resolution processing and the region not requiring the super-resolution processing input from identification medium region determiner 13. In a case where the identification medium is positioned within the region requiring the super-resolution processing (hereinafter, referred to as a "super-resolution region") (ST106: Yes), the processing proceeds to step ST107. In a case where the identification medium region is positioned within the region not requiring the super-resolution processing (ST106: No), the processing proceeds to step ST108.

In step ST107, super-resolution processor 17 performs super-resolution processing of the identification medium image. In step ST108, identification medium recognizer 18 recognizes the character and/or the numeric character included in the identification medium from the identification medium image in which the super-resolution processing input from super-resolution processing selector 16 is not performed, or the identification medium image in which the super-resolution processing input from super-resolution processor 17 is performed to read out the identification medium.

In such a manner, according to identification medium recognition device 3 according to the first exemplary embodiment, it is possible to select the execution and the non-execution of the super-resolution processing based on the position of the identification medium region in the captured image. Accordingly, by setting the region of the identification medium image imaged at the long distance, that is, by setting the region having a small region size in the captured image as a super-resolution region, the identification medium image imaged at the long distance can be subjected to the super-resolution processing. Accordingly, it is possible to recognize both the identification medium image imaged at the short distance and the identification medium image imaged at the long distance without increasing a processing load of the device.

Second Exemplary Embodiment

Figure 5:
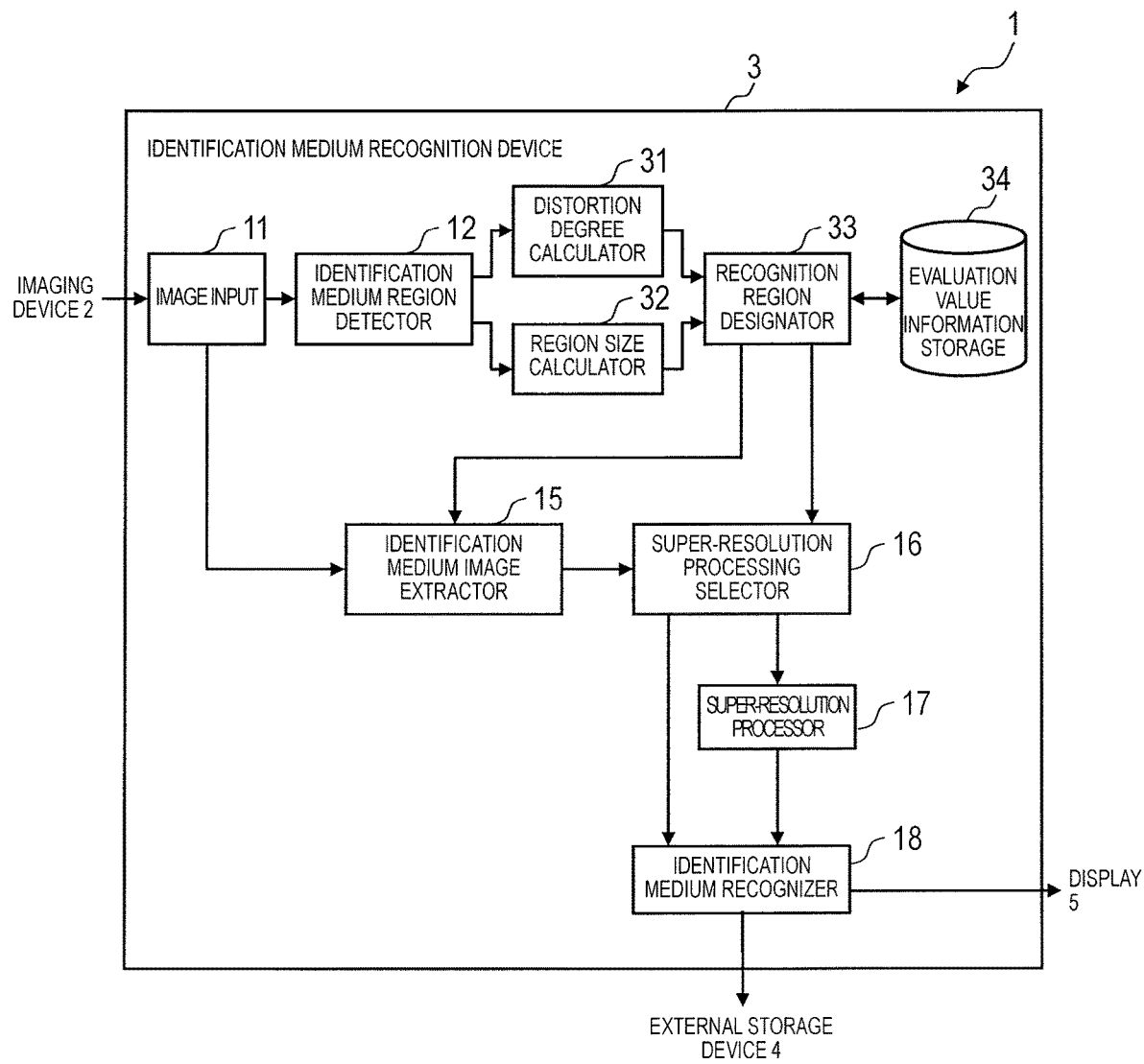
FIG. 5 is a block diagram illustrating a schematic configuration of an identification medium recognition device according to a second exemplary embodiment of the present disclosure.
Figure 6:
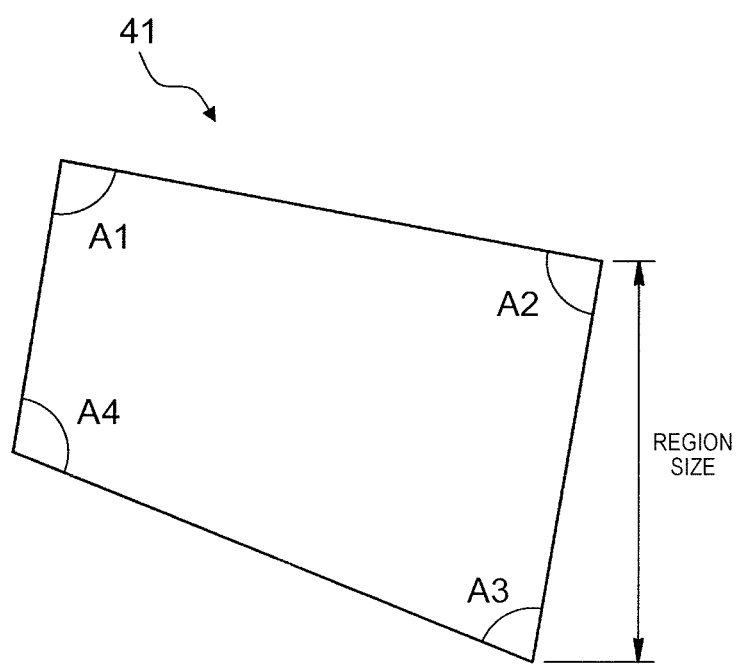
FIG. 6 is a diagram illustrating an example of the identification medium region extracted from the captured image.
Figure 7:
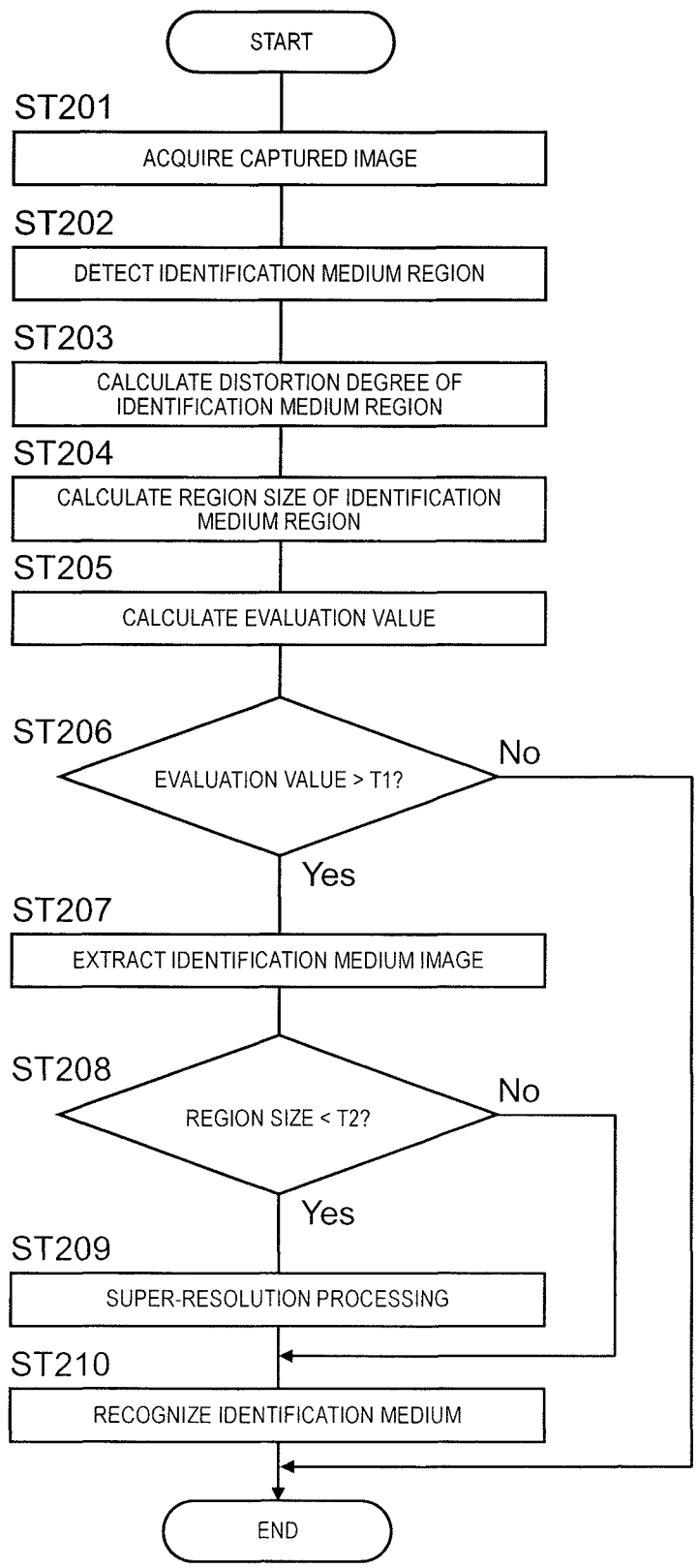
FIG. 7 is a flowchart illustrating a flow of identification medium recognition processing by the identification medium recognition apparatus according to the second exemplary embodiment of the present disclosure.

Next, regarding identification medium recognition system 1 according to a second exemplary embodiment of the present disclosure will be described using the license plate as an example of the identification medium. Identification medium recognition system 1 according to the second exemplary embodiment of the present disclosure has the same function as identification medium recognition system 1 illustrated in FIG. 1A and FIG. 1B described above. FIG. 5 is a block diagram illustrating a schematic configuration of identification medium recognition device 3 according to the second exemplary embodiment, FIG. 6 is a diagram illustrating an example of the identification medium region extracted from the captured image, and FIG. 7 is a flowchart illustrating a flow of identification medium recognition processing by identification medium recognition device 3 according to the second exemplary embodiment of the present disclosure.

The second exemplary embodiment is different from the above-described first exemplary embodiment in that identification medium recognition device 3 does not include identification medium region determiner 13 and region information storage 14, and includes distortion degree calculator 31, region size calculator 32, recognition region designator 33, and evaluation value information storage 34 instead of identification medium region determiner 13 and region information storage 14. Distortion degree calculator 31 and region size calculator 32 correspond to region parameter calculator in the claims. The other features are the same as those of the first exemplary embodiment, the description is omitted.

Distortion degree calculator 31 calculates a distortion degree that is a value indicating a degree of geometric distortion of the identification medium region. As illustrated in FIG. 6, identification medium region 41 has a substantially quadrangular shape. The distortion degree can be obtained from Expression (1) below using angles of interior corners A1 to A4 at four corners of identification medium region 41. The distortion degree calculated by distortion degree calculator 31 is input to recognition region designator 33.

[Expression 1]

$$\text{Distortion degree} = \sum_{J=1}^{4} |A_i - 90°| \qquad \text{Expression (1)}$$

Region size calculator 32 calculates the region size of the identification medium region. The number of pixels at the height of the longer side in a vertical direction in four sides defining the contour of the substantially rectangular identification medium region is defined as the region size. In FIG. 6, the height of the vertical side on the right side in the drawing is the region size. The region size calculated by region size calculator 32 is input to recognition region designator 33.

Recognition region designator 33 first calculates an evaluation value that is a value obtained by evaluating a balance between the region size and the distortion degree in the identification medium region using the distortion degree calculated by distortion degree calculator 31 and the region size calculated by region size calculator 32. The evaluation value can be obtained from Expression (2) below, in which a is a predetermined coefficient.

Evaluation Value=Region Size−α×Distortion Degree  Expression (2)

Next, recognition region designator 33 determines whether the identification medium region detected by identification medium region detector 12 is designated in the recognition region that is the region where the recognition processing of the identification medium is executed based on the calculated evaluation value. The determination is performed with reference to the information on the evaluation value stored in evaluation value information storage 34. The information on the evaluation value is preset by the user or the like, and stored in evaluation value information storage 34. Specifically, in a case where the evaluation value exceeds predetermined threshold value T1, the identification medium region is designated in the recognition region. Threshold value T1 is a value at which the balance between the region size and the distortion degree in the identification medium region is determined to be appropriate for executing the recognition processing of the identification medium. In a case where the evaluation value is equal to or less than threshold value T1, the identification medium recognition processing by identification medium recognition device 3 is terminated. In a case where the identification medium region is designated in the recognition region, recognition region designator 33 inputs the region size of the identification medium region to super-resolution processing selector 16. In addition, recognition region designator 33 instructs identification medium image extractor 15 to extract the identification medium image from the captured image.

When receiving a command to extract the identification medium image from the captured image from recognition region designator 33, the identification medium image extractor 15 extracts the identification medium image from the captured image. The extracted identification medium image is input to super-resolution processing selector 16.

Super-resolution processing selector 16 selects execution and non-execution of the super-resolution processing based on the region size of the identification medium region received from recognition region designator 33. Specifically, in a case where the region size of the identification medium region is below predetermined threshold value T2, super-resolution processing selector 16 selects the execution of the super-resolution processing. Since the region size is small, the size of the character and/or the numeric character of the identification medium is small. Accordingly, it is difficult to recognize the character and/or the numeric character by identification medium recognizer 18. Therefore, it is determined that the super-resolution processing is required. On the other hand, in a case where the region size is equal to or greater than threshold value T2, since the region size is large, it is determined that the super-resolution processing is not required. Therefore, super-resolution processing selector 16 selects the non-execution of the super-resolution processing. In a case where the execution of the super-resolution processing is selected, the identification medium image is input to super-resolution processor 17. In a case where the non-execution of the super-resolution processing is selected, the identification medium image is input to identification medium recognizer 18.

Super-resolution processor 17 performs super-resolution processing of the identification medium image. The identification medium image in which the super-resolution processing is performed is input to identification medium recognizer 18. Identification medium recognizer 18 recognizes the character and/or the numeric character included in the identification medium from the identification medium image in which the super-resolution processing input from super-resolution processing selector 16 is not performed, or the identification medium image in which the super-resolution processing input from super-resolution processor 17 is performed to readout the identification medium. The identification medium read out by identification medium recognizer 18 is stored in external storage device 4 or displayed on display 5.

As described above, the calculation method or the evaluation method of distortion degree calculator 31, region size calculator 32, and recognition region designator 33 is an example, and is not limited thereto. It is possible to use the other calculation methods or the evaluation methods. For example, it is possible to calculate the distortion degree using the length of each side defining a substantially quadrangular outline of the identification medium region without the angle of the inner angle of the identification medium region. In addition, in the present exemplary embodiment, determination whether or not to designate the identification medium region as the recognition region that is a region where the recognition processing of the identification medium is executed is performed using both the distortion degree and the region size. However, it is possible to perform the determination using only one of the distortion degree and the region size.

Next, a flow of the identification medium recognition processing by identification medium recognition device 3 according to the second exemplary embodiment illustrated in FIG. 5 will be described with reference to FIG. 7.

First, image input 11 acquires the captured image imaged by imaging device 2 (ST201). Subsequently, identification medium region detector 12 detects the identification medium region from the captured image (ST202).

Next, in step ST203, distortion degree calculator 31 calculates the distortion degree of the identification medium region. In following step ST204, region size calculator 32 calculates the region size of the identification medium region. In next step ST205, recognition region designator 33 calculates the evaluation value that is a value indicating a balance between the distortion degree and the region size of the identification medium region using the distortion degree and the region size of the identification medium region.

In next step ST206, recognition region designator 33 determines whether the evaluation value exceeds predetermined threshold value T1. In step ST206, in a case where it is determined that the evaluation value exceeds threshold value T1 (ST206: Yes), the processing proceeds to step ST207, and in a case where it is determined that the evaluation value is below threshold value T1 (ST206: No), the processing is terminated.

In step ST207, identification medium image extractor 15 extracts the identification medium image from the captured image. In the following step ST208, super-resolution processing selector 16 determines whether the region size of the identification medium region is below predetermined threshold value T2. In step ST208, in a case where it is determined that the region size is below threshold value T2 (ST208: Yes), the processing proceeds to step ST209, and in a case where it is determined that the region size exceeds threshold value T2 (ST208: No), the processing proceeds to step ST210.

In step ST209, super-resolution processor 17 performs super-resolution processing of the identification medium image. In step ST210, identification medium recognizer 18 recognizes the character and/or the numeric character included in the identification medium from the identification medium image in which the super-resolution processing is performed, or the identification medium image in which the super-resolution processing is not performed to read out the identification medium.

In such a manner, according to identification medium recognition device 3 according to the second exemplary embodiment, it is possible to select the execution and the non-execution of the super-resolution processing based on the region size and the distortion degree of the identification medium region. Accordingly, by detecting the region of the identification medium image imaged at the long distance, that is, the region having a small region size in the captured image based on the distortion degree and the region size, the identification medium image imaged at the long distance can be subjected to the super-resolution processing. Accordingly, it is possible to recognize both the identification medium image imaged at the short distance and the identification medium image imaged at the long distance without increasing a processing load of the device.

Third Exemplary Embodiment

Next, regarding identification medium recognition system 1 according to a third exemplary embodiment of the present disclosure will be described using the license plate as an example of the identification medium. Identification medium recognition system 1 according to the third exemplary embodiment of the present disclosure has the same function as identification medium recognition system 1 illustrated in FIG. 1A and FIG. 1B described above. However, the third exemplary embodiment is different from the above described first embodiment in that imaging device 2 is not mounted on the side or upper side of the roadway but on the host vehicle, and the license plate of the other vehicle is imaged while the host vehicle is traveling. The other features are the same as those of the first exemplary embodiment, the description is omitted.

Imaging device 2 is disposed near the upper end of a windshield of the host vehicle (for example, the back side of a room mirror) and images the region spreading in a predetermined angle range in front of the host vehicle. Therefore, the license plate of the other vehicle that is present in front of the vehicle can be imaged while the host vehicle is travelling. The other vehicle includes a preceding vehicle traveling in the same direction as the traveling direction of the own vehicle, an oncoming vehicle traveling in a direction opposite to the traveling direction of the own vehicle, a stopped vehicle stopped in front of the host vehicle, and the like. As imaging device 2, an in-vehicle camera for a drive recorder can be used. The type, the number, the arrangement position, and the like of imaging devices 2 are not particularly limited, and various modifications are possible. For example, it may be configured such that imaging device 2 is disposed at a rear portion of the host vehicle and images the license plate of the other vehicles present behind the host vehicle.

Figure 8A:
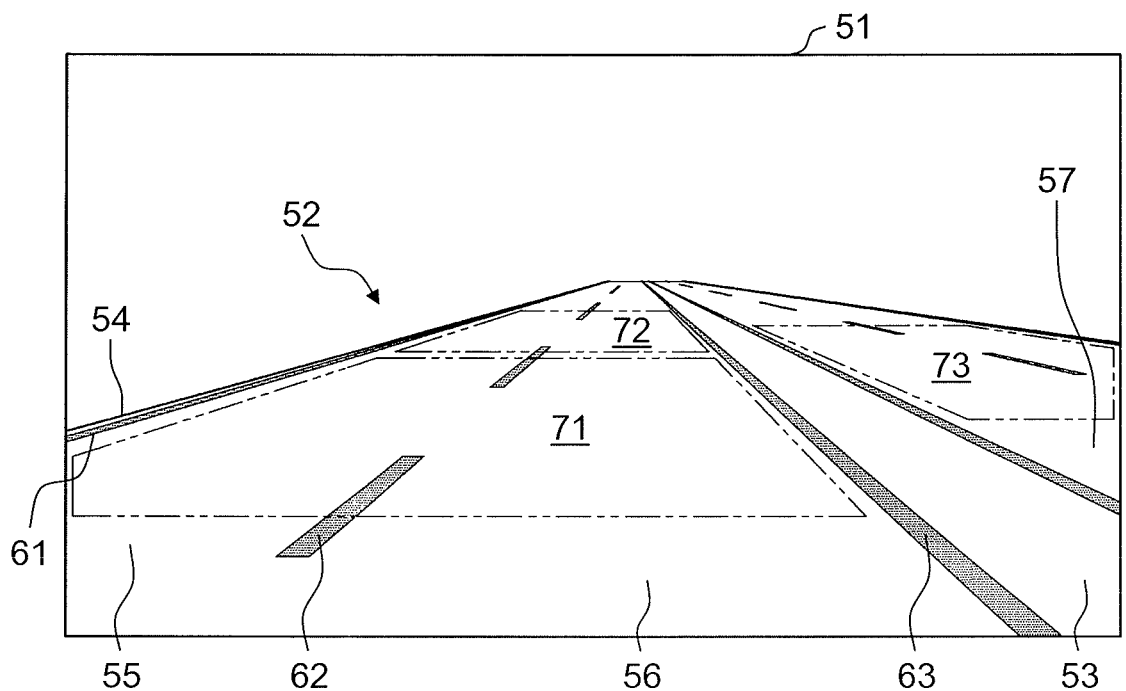
FIG. 8A is a diagram illustrating an example of a captured image imaged by an imaging device in an identification medium recognition system according to a third exemplary embodiment of the present disclosure, and is a diagram of a case where a host vehicle is traveling in a second driving lane.
Figure 8B:
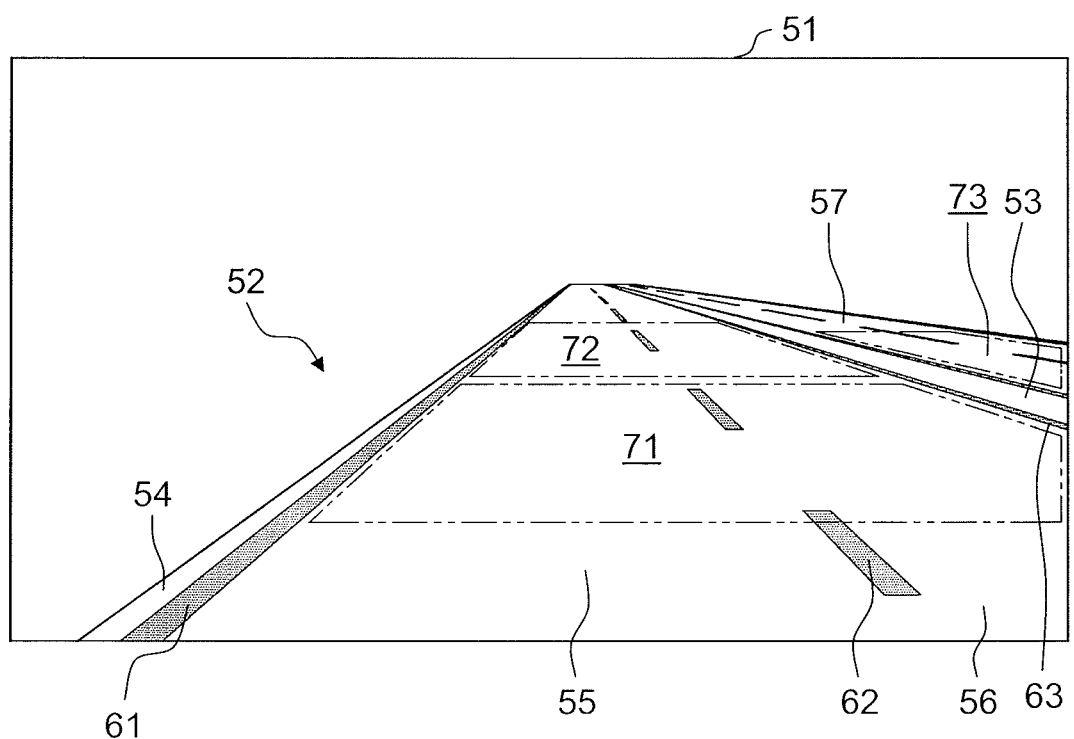
FIG. 8B is a diagram illustrating an example of the captured image imaged by the imaging device in the identification medium recognition system according to the third exemplary embodiment of the present disclosure, and is a diagram of a case where the host vehicle is traveling in a first driving lane.

FIGS. 8A and 8B are diagrams illustrating an example of captured image 51 imaged by imaging device 2. As illustrated in FIGS. 8A and 8B, roadway 52 in front of the host vehicle is included in captured image 51. Roadway 52 is one-way two-lanes road including center median 53, and the host vehicle is traveling from the front side (lower side in the drawing) to the back side (upper side in the drawing) in the drawing. In the two-lane roadway of roadway 52, the lane on roadside strip 54 side (left side in the drawing) is referred to as first driving lane 55, and the lane on center median 53 side is referred to as second driving lane 56. That is, first driving lane 55 is a lane between roadway outside line 61 and lane boundary line 62, and second driving lane 56 is a lane between lane boundary line 62 and roadway center line 63. In FIG. 8A, the host vehicle is travelling on second driving lane 56, and in FIG. 8B, the host vehicle is travelling on first driving lane 55.

Recognition region 71 on the side close to the host vehicle (lower side in the drawing) and recognition region 72 on the side far from the host vehicle (upper side in the drawing) are set on the both driving lanes of first driving lane 55 and second driving lane 56, respectively. In addition, recognition region 73 is set on oncoming lane 57 interposing center median 53. Recognition region 71 is a region not requiring the super-resolution processing and recognition region 72 and recognition region 73 are regions requiring the super-resolution processing. As described in the first exemplary embodiment, in order to recognize the license plate of the vehicle, it is necessary that the region size of the identification medium image has a certain size. Since the identification medium image imaged in recognition region 71 whose distance to imaging device 2 is short is that the region size has a certain size, the super-resolution processing is not required. On the other hand, since the identification medium image imaged in recognition regions 72 and 73 whose the distance to imaging device 2 is long is that the region size is small, the super-resolution processing is required.

Since imaging device 2 is mounted on the host vehicle, recognition regions 71, 72, and 73 are changed depending on travelling of the host vehicle. Accordingly, when the host vehicle is travelling, it is required to set recognition regions 71, 72, and 73 as needed. Specifically, first, first driving lane 55, second driving lane 56, and oncoming lane 57 are recognized. The recognition of first driving lane 55, second driving lane 56, and oncoming lane 57 may be performed based on a compartment line such as roadway outside line 61, lane boundary line 62, or roadway center line 63 drawn on a read surface of roadway 52. A predetermined range and shape on both driving lanes of first driving lane 55 and second driving lane 56 close to the host vehicle is set as recognition region 71, and a predetermined range and shape region on the side far from the host vehicle is set as recognition region 72. In addition, the predetermined range and shape region on oncoming lane 57 is set as recognition region 73. Information on the range and the shape of recognition regions 71, 72, and 73 are preset by the user or the like, and stored in, for example, a storage.

Alternatively, positions, shapes, and inclination angles of compartment lines 61, 62, and 63 on captured image 51 are recognized, and the ranges and the shapes of recognition region 71, 72, and 73 may be set according to the recognition result thereof. Information on the ranges and the shapes of recognition region 71, 72, and 73 corresponding to the positions or the like of compartment lines 61, 62, and 63 on captured image 51 is preset by the user or the like, and stored in, for example, a storage. In addition, the recognition of oncoming lane 57 may be performed based on a motion vector of the other vehicles. In a case where a direction of the motion vector of the other vehicle is a direction close to the host vehicle, the other vehicle can be determined that the other vehicle is travelling on oncoming lane 57.

The recognition processing of the identification medium is performed in the same manner as described in the first exemplary embodiment. That is, in a case where the identification medium region detected from captured image 51 is positioned within recognition regions 72 and 73 requiring the super-resolution processing, the execution of the super-resolution processing is selected, and in a case where identification medium region is positioned within recognition region 71 not requiring the super-resolution processing, the execution of the super-resolution processing is not selected.

In such a manner, according to identification medium recognition system 1 according to the third exemplary embodiment, the license plate of the other vehicle is imaged by imaging device 2 mounted on the host vehicle while the host vehicle is travelling, and the execution and the non-execution of the super-resolution processing can be selected based on the position of the identification medium region in captured image 51. Accordingly, even in a case where the license plate of the other vehicle is imaged from the travelling host vehicle, it is possible to recognize both the identification medium image imaged at the short distance and the identification medium image imaged at the long distance without increasing a processing load of the device.

In the third exemplary embodiment, the one-way two-lanes road is described as an example, but it is not limited thereto. The third exemplary embodiment can also be applied to the one-way one-lane road, the one-way three or more-lanes road, a single lane road, and the like. In a case where, the compartment line is not drawn on the road surface of roadway 52 on the single lane road, the road surface in front of the host vehicle is detected as roadway 52, the region of the predetermined range and the shape at the side close the host vehicle on roadway 52 is set as recognition region 71, and the region of the predetermined range and the shape at the side far from the host vehicle is set as recognition region 72.

Fourth Exemplary Embodiment

Next, identification medium recognition system 1 according to a fourth exemplary embodiment of the present disclosure will be described. Identification medium recognition system 1 according to the fourth exemplary embodiment of the present disclosure has the same function as identification medium recognition system 1 illustrated in FIG. 1A and FIG. 1B described above. However, identification medium recognition system 1 according to the fourth exemplary embodiment is different from the above described first embodiment in that the ID card on a person's body is recognized instead of the license plate of the vehicle. The other features are the same as those of the first exemplary embodiment, the description is omitted.

Figure 9:
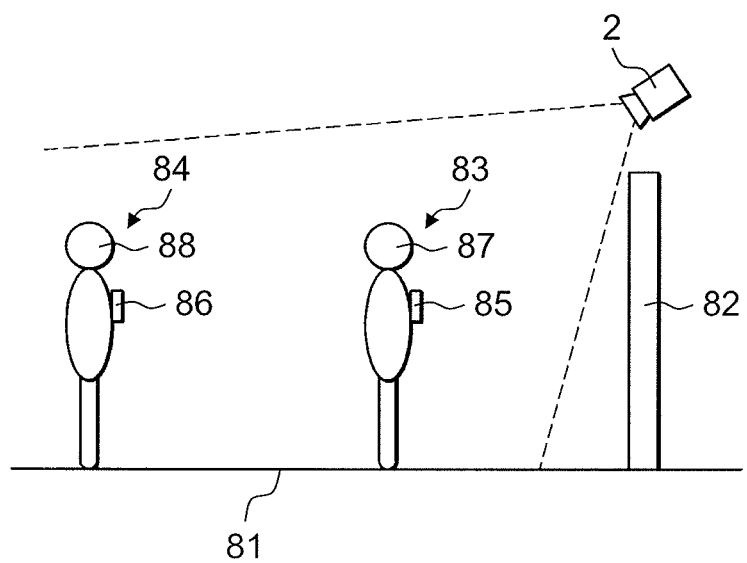
FIG. 9 is a schematic configuration diagram illustrating an identification medium recognition system according to a fourth exemplary embodiment of the present disclosure.

FIG. 9 is a schematic diagram illustrating identification medium recognition system 1 according to the fourth exemplary embodiment of the present disclosure. Identification medium recognition system 1 according to the fourth exemplary embodiment is a system for imaging and reading the ID card in order to perform personal authentication. In the fourth exemplary embodiment, it is assumed that ID authentication is performed by the ID card in order to manage entering and leaving a room in the building.

As illustrated in FIG. 9, security gate 82 for managing entering and leaving the room next to the room is installed in passage 81 in the building, and on a ceiling or wall above security gate 82 or in the vicinity thereof, imaging device 2 is disposed. There are persons 83 and 84 in front of security gate 82, and persons 83 and 84 attach ID cards 85 and 86 on the chest. ID cards 85 and 86 may be hung from the neck instead of attaching on the chest. In addition, in the fourth exemplary embodiment, the number of the persons is two, but the number of the persons is not particularly limited.

Imaging device 2 images the region the region spreading in a predetermined angle range in front of security gate 82. Therefore, ID cards 85 and 86 attached on the chest of persons 83 and 84 can be imaged. In the fourth exemplary embodiment, a box camera is used as imaging device 2, but imaging device 2 is not particularly limited thereto. For example, imaging device 2 may be an omnidirectional camera.

Figure 10:
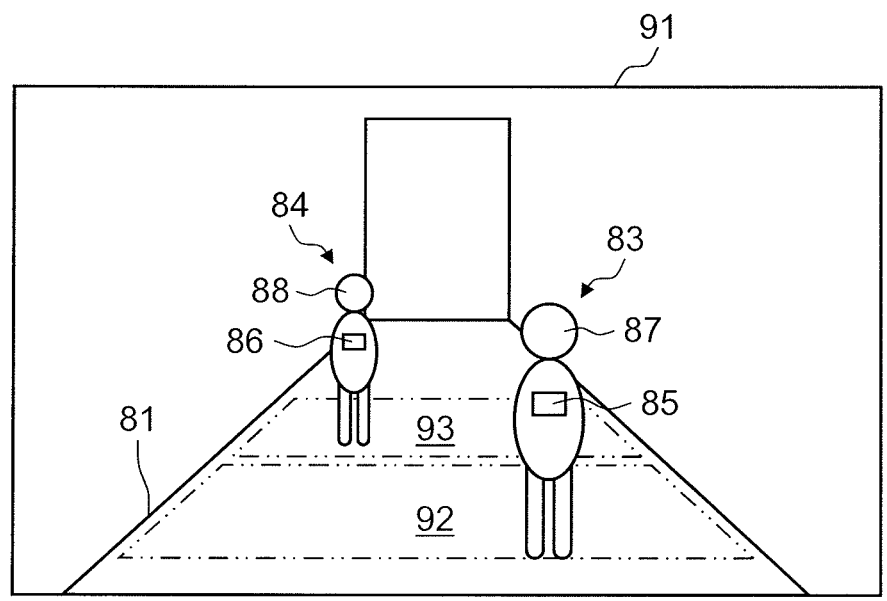
FIG. 10 is a diagram illustrating an example of the captured image imaged by the imaging device.

FIG. 10 is a diagram illustrating an example of captured image 91 imaged by imaging device 2. As illustrated in FIG. 10, ID cards 85 and 86 attached on the chest of persons 83 and 84 are included on captured image 91. In addition, as illustrated in FIG. 10, recognition region 92 is set at the side close imaging device 2 in captured image 91 (lower side in the drawing) and recognition region 93 is set at the side far from imaging device 2 (upper side in the drawing). Recognition region 92 is a region not requiring the super-resolution processing and recognition region 93 is a region requiring the super-resolution processing. Recognition regions 92 and 93 are preset by the user, and stored in region information storage 14 of identification medium recognition device 3.

As described in the first exemplary embodiment, in order to recognize the ID card, it is necessary that the region size of the identification medium image has a certain size. Since the ID card image imaged in recognition region 92 whose distance to imaging device 2 is short is that the region size has a certain size, the super-resolution processing is not required. On the other hand, since the ID card image imaged in recognition region 93 whose the distance to imaging device 2 is long is that the region size is small, the super-resolution processing is required. In addition, if a geometric distortion of the identification medium image is large, it becomes impossible to recognize the identification medium. Therefore, it is necessary that the identification medium image has a small geometric distortion. In a case where imaging device 2 is disposed above security gate 82 as illustrated in FIG. 9, when the identification medium is too close security gate 82, the geometric distortion of the identification medium image becomes greater in some cases. In this case, it is preferable that recognition region 92 is set on a region slightly behind security gate 82 and having a small geometric distortion. On the other hand, if it is possible to image the identification medium image having a small geometric distortion to a relatively close proximity of security gate 82, such as a case where imaging device 2 is beside security gate 82, recognition region 92 can be set up close to security gate 82.

The recognition processing of the ID card is performed in the same manner as described in the first exemplary embodiment. That is, in a case where the identification medium region detected from captured image 91 is positioned within recognition region 93 requiring the super-resolution processing, the execution of the super-resolution processing is selected, and in a case where identification medium region is positioned within recognition region 92 not requiring the super-resolution processing, the execution of the super-resolution processing is not selected.

In such a manner, according to identification medium recognition system 1 according to the fourth exemplary embodiment, the ID cards 85 and 86 on the chest of persons 83 and 84 is imaged by imaging device 2, and the execution and the non-execution of the super-resolution processing can be selected based on the position of the ID card region in captured image 91. Accordingly, even in a case where the ID card is imaged for ID authentication, it is possible to recognize both the ID card image imaged at the short distance and the ID card image imaged at the long distance without increasing a processing load of the device.

In addition, according to identification medium recognition system 1 according to the fourth exemplary embodiment, since ID authentication is possible not only in recognition region 92 which is close to imaging device 2 but also in recognition region 93 which is far from imaging device 2, even in a case where there are a plurality of subjects for ID authentication, it is possible to perform ID authentication of a plurality of persons rapidly and efficiently by performing ID authentication in both recognition regions 92 and 93. In addition, when ID authentication is possible in both recognition region 92 close to security gate 82 and recognition region 93 far from security gate 82, opportunities for ID authentication increase, and it becomes easier to detect a suspicious individual. Accordingly, it is possible to prevent tailgating that a person who has not undergone ID authentication enters illegally with a person who has been subjected to ID authentication.

In addition to the ID authentication by ID cards 85 and 86, face authentication may also be performed, and the authentication result of face authentication and the authentication result of ID authentication may be matched. In this manner, by combining ID authentication and face authentication, prevention of spoofing, improvement of visibility of entrance records, recording of suspicious individuals, and the like can be realized. In this case, by matching the images of face regions 87 and 88 (see FIGS. 9 and 10) of persons 83 and 84 in captured image 91 with the face image of the person to be authenticated stored in the storage unit in advance, the face authentication may be performed. The method of matching the images of face regions 87 and 88 with the face image of the person to be authenticated is not particularly limited, and various techniques such as a method based on similarity can be used.

In addition, identification medium recognition system 1 according to the fourth exemplary embodiment can be applied not only to personal authentication with security gate 82 but also to ID authentication in various other uses. For example, in a construction site or a building site, an identification medium in which worker information such as a name and an identification number of a worker is written on a helmet worn by the worker may be attached in some cases. In such a case, by applying identification medium recognition system 1 according to the fourth exemplary embodiment, it is possible to read out the worker information from the identification medium attached to the helmet. Accordingly, it is possible to manage various states such as work state and health condition for each worker. For example, by extracting biological information such as a pulse wave and a pulse from a skin color region of the worker, it is possible to manage the health condition for each worker.

Fifth Exemplary Embodiment

Next, regarding identification medium recognition system 1 according to a fifth exemplary embodiment of the present disclosure will be described using the license plate as an example of the identification medium. Identification medium recognition system 1 according to the fifth exemplary embodiment of the present disclosure has the same function as identification medium recognition system 1 illustrated in FIG. 1A and FIG. 1B described above.

In the fifth embodiment of the present disclosure, a license plate used in Japan, that is, an automobile registration number will be described as an example of the identification medium. In the automobile registration number, a series designation number is displayed as a character string to be subjected to recognition processing by identification medium recognition device 3. This series designation number is mainly composed of 4 digits Arabic numeric characters in which a hyphen "-" is inserted between upper two digits and lower two digits. In addition, in a case where the series designation number is a number less than or equal to three digits, a midpoint "•" is displayed instead of "0" (or blank) in the higher digit (here, the middle point "•" is treated as a numeric character).

The character string in the identification medium image recognized by identification medium recognition system 1 is preferably composed of characters (in particular, numeric characters), but is not limited to strictly including characters (including numeric characters), and may include symbols and simple graphics. In addition, the number of characters of such a character string is not limited to four (here, four digits), but may be at least plural. Furthermore, the characters in such a character string are not limited to the characters arranged in an array such as a plurality of numeric characters, but may constitute at least a character group, and may be a character as long as the arrangement order can be substantially set according to the position in the identification medium image or the relative position between the characters.

Imaging device 2 is configured of a digital still camera or a digital video camera including an image sensor such as a CCD or the like, and images the vehicles or the like including the license plate as the identification medium to acquire the identification medium image. The identification medium image is the captured image including the identification medium as a main subject, but usually includes a vehicle body other than the identification medium, a surrounding object, and the like. As imaging device 2, for example, a surveillance camera installed on roads, entrances of facilities, or the like or an in-vehicle camera mounted on a vehicle or the like can be used. The identification medium image imaged by imaging device 2 is sequentially sent to identification medium recognition device 3, the identification medium image is disposed on display 5, and stored in external storage device 4. The identification medium image may have a configuration in which the identification medium image is temporarily stored in the memory in imaging device 2 without being sent directly to identification medium recognition device 3.

Identification medium recognition device 3 is, for example, a personal computer (PC). As illustrated in FIG. 1B, in identification medium recognition device 3, processor 121 that comprehensively executes processing for recognizing the character string in the identification medium image based on a predetermined control program, random access memory (RAM) 122 that is a volatile memory functioning as a work region or the like of processor 121, and read only memory (ROM) 123 that is a nonvolatile memory for storing the control program executed by processor 121 or data are connected to input and output bus 25, respectively. In addition, in identification medium recognition device 3, input device 124 that is an input device such as a keyboard and a mouse, display 5 that is a monitor such as a liquid crystal, external storage device 4 that is a storage such as a hard disk drive (HDD) and a flash memory, and the like are connected as peripheral devices. In functional block diagram of FIG. 11 to be described later, the function of each part of identification medium recognition device 3 can be realized mainly by processor 121 executing the control program.

The connection form between identification medium recognition device 3, imaging device 2, external storage device 4, and display 5 is not particularly limited, and it may be directly connected by a communication cable, for example, a local area network (LAN), or may be in the form of network connection via wired or wireless communication. In addition, identification medium recognition device 3 can be realized not only as the PC but also as a server having a similar function, a digital camera, or the like.

In external storage device 4, the identification medium image imaged by imaging device 2 and image data of an individual character (hereinafter referred to as a "reference character") that can constitute a character string of the identification medium to be recognized are stored. In the present exemplary embodiment, image data of all Arabic numeric characters (here, "1" to "9") and the midpoint "•", which constitute the series designation number, are included in the reference image as image data of the reference character.

Figure 11:
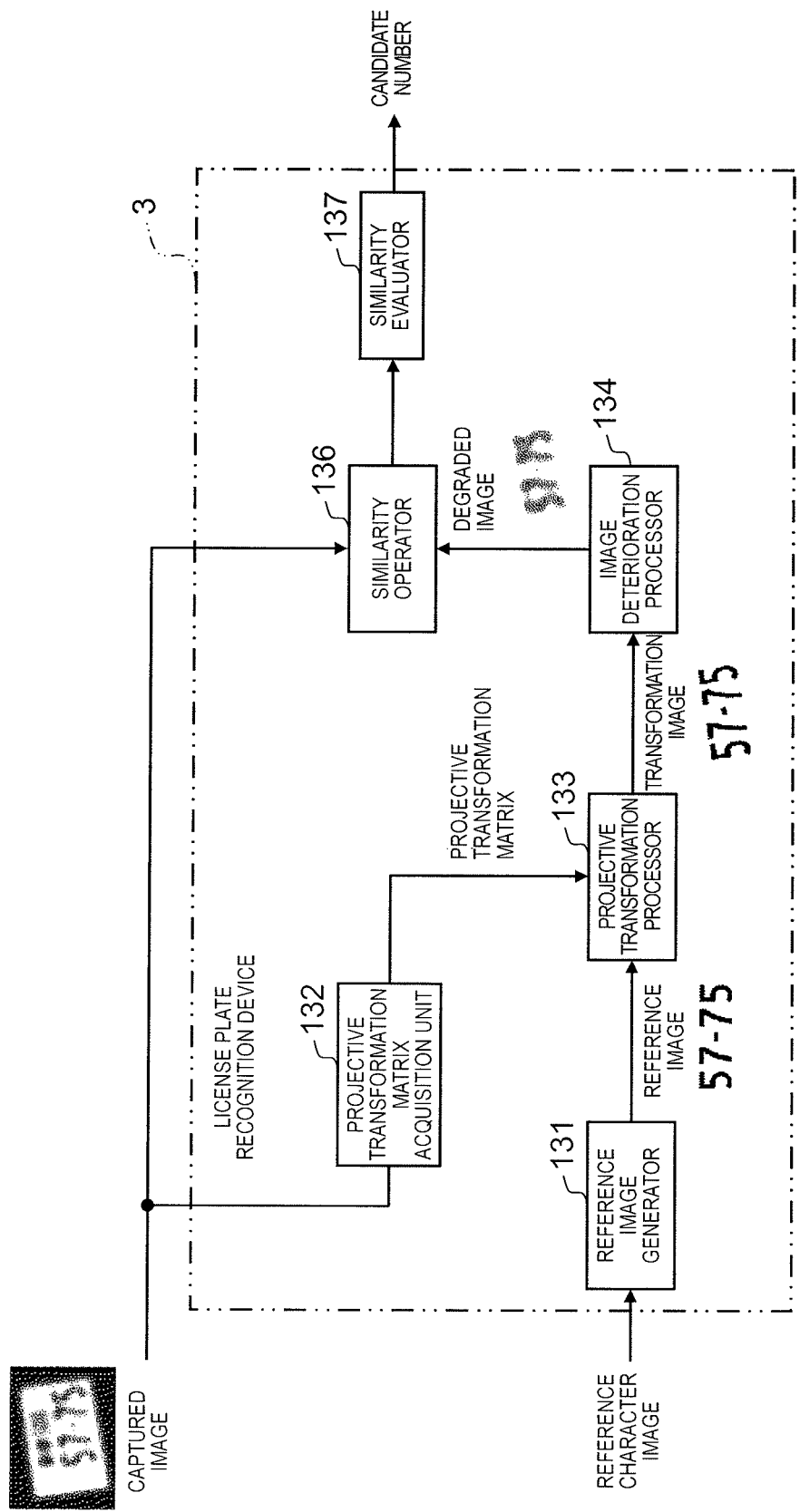
FIG. 11 is a functional block diagram according to a fifth exemplary embodiment of the identification medium recognition device illustrated in FIG. 1A.
Figure 15:
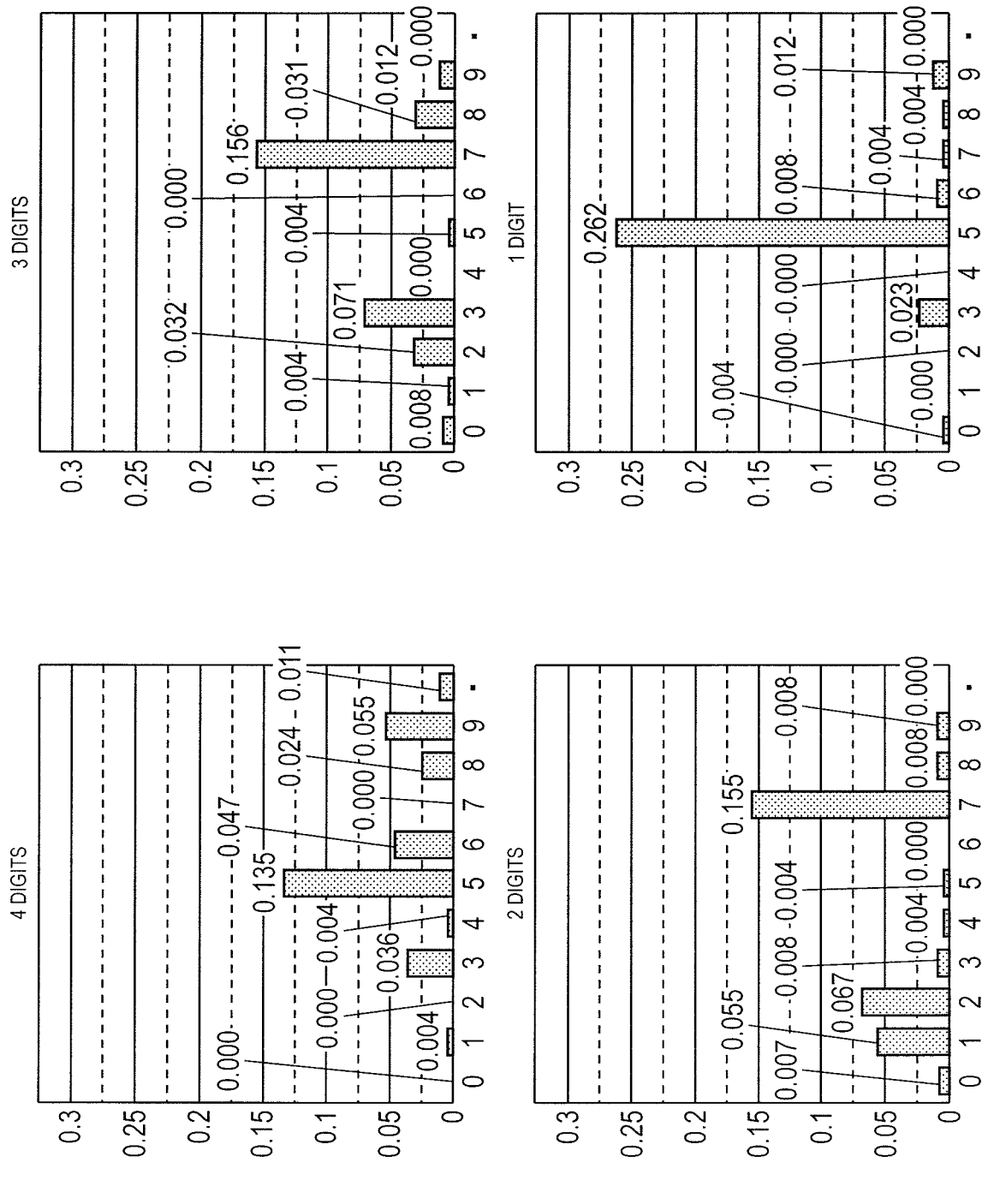
FIG. 15 is an explanatory diagram illustrating a modified example of an extraction method of a candidate number by the similarity evaluator in FIG. 11.

FIG. 11 is a functional block diagram according to the fifth exemplary embodiment of identification medium recognition device 3 illustrated in FIG. 1A. FIG. 12 is a diagram illustrating an example of a calculation result by similarity calculator 136 in FIG. 11, and FIG. 13 is a diagram illustrating an example of extraction of a higher-order candidate of a correlation value by similarity evaluator 137 in FIG. 11. FIG. 14 is a diagram illustrating an example of an evaluation value calculation result of each digit by similarity evaluator 137 in FIG. 11. FIG. 15 is an explanatory diagram illustrating a modified example of an extraction method of a candidate number by similarity evaluator 137. In FIG. 15, for each digit, a vertical axis indicates the evaluation value, and a horizontal axis indicates the numeric character.

In the identification medium recognition device 3 illustrated in FIG. 11, reference image generator 131 acquires images of reference characters stored in external storage device 4, and by appropriately combining the images of the reference characters, reference images of all character strings that can be displayed on the identification medium to be recognized (license plate) are sequentially generated. In FIG. 11, a case where the fourth digit character string "5775" is generated as the reference image is shown (more precisely, a hyphen "-" is inserted between the upper two digits and the lower two digits. The same also applies in below.), but in practical, 9999 kinds of reference images "•••1" to "9999" constituting the series designation number (character string to be recognized) are sequentially generated.

In addition, projective transformation matrix acquisition unit 132 acquires the identification medium (license plate) image to be evaluated stored in external storage device 4 and detects corner portions (four corners) of the identification medium (license plate) on the image to calculate a plane projection transformation matrix from coordinates of these four points. Projective transformation processor 133 sequentially projectively transforms the reference image generated by reference image generator 131 using the planar projective transformation matrix. Accordingly, a transformed reference image (hereinafter referred to as a "converted image") similar to the identification medium (license plate) of the captured image is obtained. Image deterioration processor 134 executes simulated degradation processing by image processing such as downsampling of the converted image and blurring processing to sequentially generate images with degraded converted images (hereinafter referred to as a "degraded images").

Similarity calculator 136 acquires the image of the identification medium (license plate) of the evaluation target stored in external storage device 4, and sequentially calculates the similarity with each degraded image for the character string in the image. In the present exemplary embodiment, the following image correlation coefficient (hereinafter referred to as a "correlation value") is used as the similarity indicating the high degree of similarity between images.

[Expression 2]

Correlation coefficient $$r = \frac{\sum_{j=1}^{N}\sum_{i=1}^{M}(f(i,j)-\bar{f})(s(i,j)-\bar{s})}{\sqrt{\sum_{j=1}^{N}\sum_{i=1}^{M}(f(i,j)-\bar{f})^2}\sqrt{\sum_{j=1}^{N}\sum_{i=1}^{M}(s(i,j)-\bar{s})^2}}$$

$f(i, j)$: License plate image luminance value $\bar{f}$: License plate image average luminance value $s(i, j)$: Reference image luminance value $\bar{s}$: Reference image average luminance value As illustrated in FIG. 12, the correlation value for each series designation number from "•••1" to "9999" is obtained as the calculation processing result of similarity by similarity calculator 136. These correlation values are displayed on display 5 and stored in external storage device 4.

As illustrated in FIG. 13; similarity evaluator 137 extracts a series designation number in which the order of magnitude of correlation values is within a threshold (here, the top 80) based on the correlation value for each series designation number illustrated in FIG. 12. FIG. 13 shows an example in which series designation number "5575" at which the correlation value is the maximum and series designation number "5025" at which the magnitude of the correlation value is the 80th position are extracted. Similarity evaluator 137 may have a configuration in which a series designation number whose magnitude of the correlation value is equal to or larger than the predetermined threshold value instead of extracting a predetermined number (here, 80) of series designation numbers as described above.

In addition, similarity evaluator 137 obtains the sum of similarities of the series designation number in the reference image having the same digit for each numeric character (here, one numeric character) of the each digit numeric character (arrangement order) to be evaluated in the extracted series designation number. Furthermore, similarity evaluator 137 obtains a value obtained by dividing the sum of the similarities by the number of extracted serial designation number, as the evaluation value. More specifically, similarity evaluator 37 obtains, for each digit (here, 1 digit to 4 digits), for each numeric character (ten numeric characters including "1" to "9"and".", the sum of the degree of similarity of the series designation number (that is, the similarity of the numeric character in 4 digits), and the sum is divided by 80 as the evaluation value.

For example, in a case where the evaluation value for the numeric character "5" of the 4 digits (denoted by reference numeral 40 in FIG. 13) in the series designation number, similarity evaluator 137 sets a value obtained by dividing the sum of the correlation value 0.3993 of the series designation number "5575", the correlation value 0.3575 of the series designation number "5725", the correlation value 0.3537 of the series designation number "5715", the correlation value 0.3534 of the series designation number "5375", •••, the correlation value 0.3007 of the series designation number "5175", the correlation value 0.3009 of the series designation number "5777", and the correlation value 0.2985 of the series designation number "5025" by 80 as the evaluation value.

In this manner, similarity evaluator 137 can obtain the evaluation values for each of the numeric character "0" to "9" and "-" of the 1 digit to the 4 digits as illustrated in FIG. 14. In addition, similarity evaluator 37 extracts (determines) the numeric character having the maximum value with respect to the evaluation value of each digit in FIG. 14 as a character candidate (first candidate) which can constitute a character string in the identification medium (license plate) image. In the example of FIG. 14, the numeric character "5" is the maximum evaluation value in the 4 digits, the numeric character "7" is the maximum evaluation value in the 3 digits, the numeric character "7" is the maximum evaluation value in the 2 digits, and the numeric character "5" is the maximum evaluation value in the 1 digit. Accordingly, similarity evaluator 137 determines the series designation number "5775" as the first candidate number of the character string in the identification medium (license plate) image, outputs the number to display 5 and stores the number on external storage device 4.

In the present exemplary embodiment, an example in which only the first candidate number is obtained is shown. However, in consideration of the difference between the evaluation value of the first candidate number and the other evaluation value, similarity evaluator 137 may determine, for example, a plurality of candidate numbers equal to or smaller than the second candidate number. Similarity evaluator 37 can determine one numeric character having the smallest difference from the evaluation value of each digit of the series designation number "5775" as a numeric character configuring the second candidate number based on the evaluation value of each numeric character in each digit. More specifically, in the example of FIG. 15, an evaluation value difference (0.080) between "5" having the highest evaluation value (0.135) and "9" having the second highest evaluation value (0.055) in the 4 digits is smaller than the difference of similar evaluation values in other digits (for example, the difference (0.085) between the evaluation values of "7" and "3" in the 3 digits, the difference (0.088) between the evaluation values of "7" and "2" in the 2 digits, and a difference (0.239) between the evaluation values of "5" and "3" in the 1 digit. Similarity evaluator 137 can set the fourth candidate "9" as the second candidate number as "9775" replaced with the corresponding 4 digits "5" at the series designation number "5775". Similarity evaluator 137 may extract further candidate numbers ("5375", "5725", or the like in the example of FIG. 15) that is equal to or smaller than the third candidate number by the same method as described above. In addition, in the present exemplary embodiment, similarity evaluator 137 determines all the candidates of the four digit numeric characters, but it may be configured to determine only a part thereof.

In addition, in the present exemplary embodiment, the evaluation value for each digit (that is, one digit) is calculated. However, it is also possible to adopt a configuration in which at least a number (for example, two digits) smaller than the number of characters configuring the character string to be recognized to calculate the evaluation value.

Figure 16:
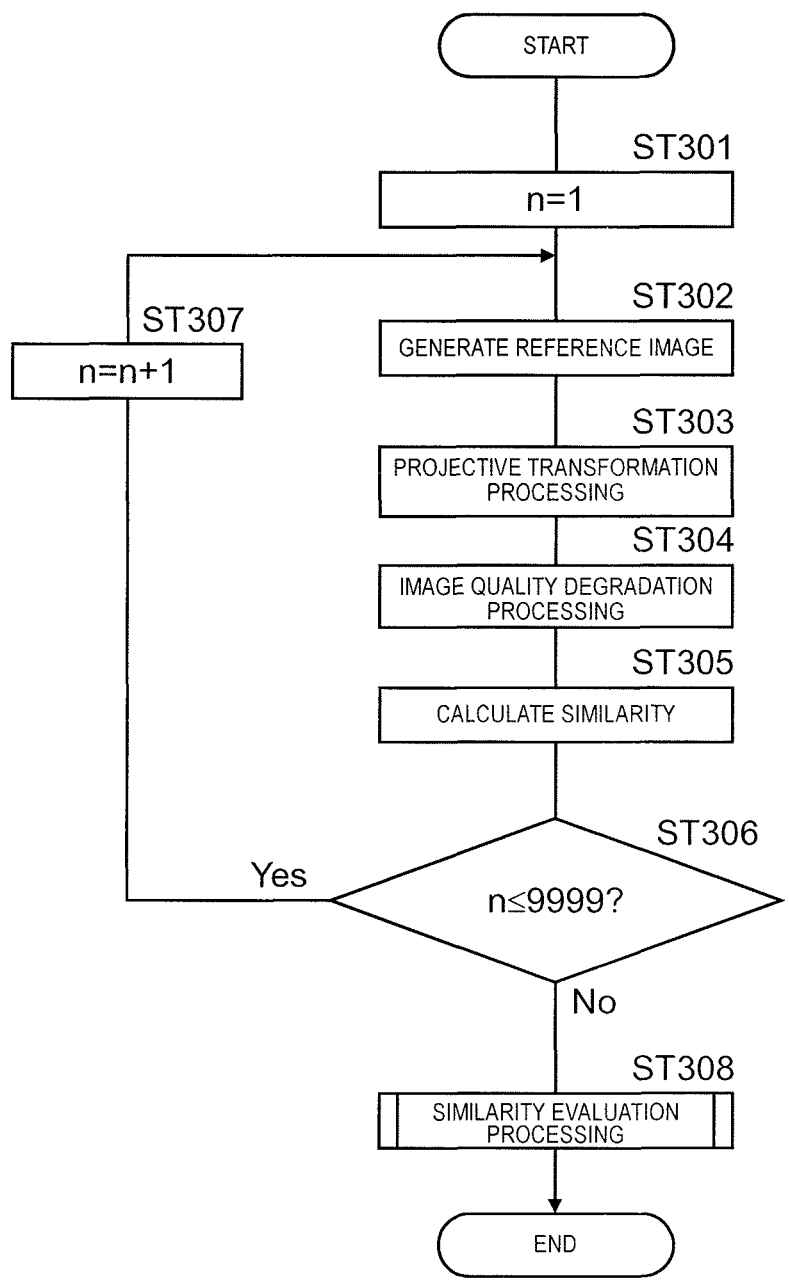
FIG. 16 is a flowchart illustrating a flow of processing according to a fifth exemplary embodiment of the identification medium recognition device illustrated in FIG. 1A.

FIG. 16 is a flowchart illustrating a flow of processing of identification medium recognition device 3 illustrated in FIG. 1A.

In the recognition processing of the character string by identification medium recognition device 3, first, series designation number n is set to 1 (n=1) (ST301), and a reference image (that is, "•••1" or the like) which is configured of the reference character corresponding to the series designation number is generated (ST302).

Thereafter, the reference image generated in step ST302 is subjected to projective transformation to generate a transformed image (ST303). Subsequently, the transformed image generated in step ST303 is subjected to degradation processing, whereby generating a degraded image (ST304). Furthermore, similarity (here, the correlation value) between the degraded image generated in step ST304 and the character string in the identification medium (license plate) image of the recognition target is calculated (ST305).

It is determined whether the series designation number n is equal to or less than 9999 (n≤9999) (that is, whether or not a reference image whose similarity is to be calculated is left) (ST306), and in a case where the reference image for which similarity is to be calculated is left (Yes), 1 is added to n (n=n+1) (ST307), and the process returns to step ST302 to execute the same processing as described above. Finally, when the series designation number n exceeds 9999 (ST306: No), similarity evaluation processing to be described in detail later is executed (ST308) based on the similarity calculated for each series designation number in step ST305. Accordingly, the character string recognition processing is completed.

Figure 17:
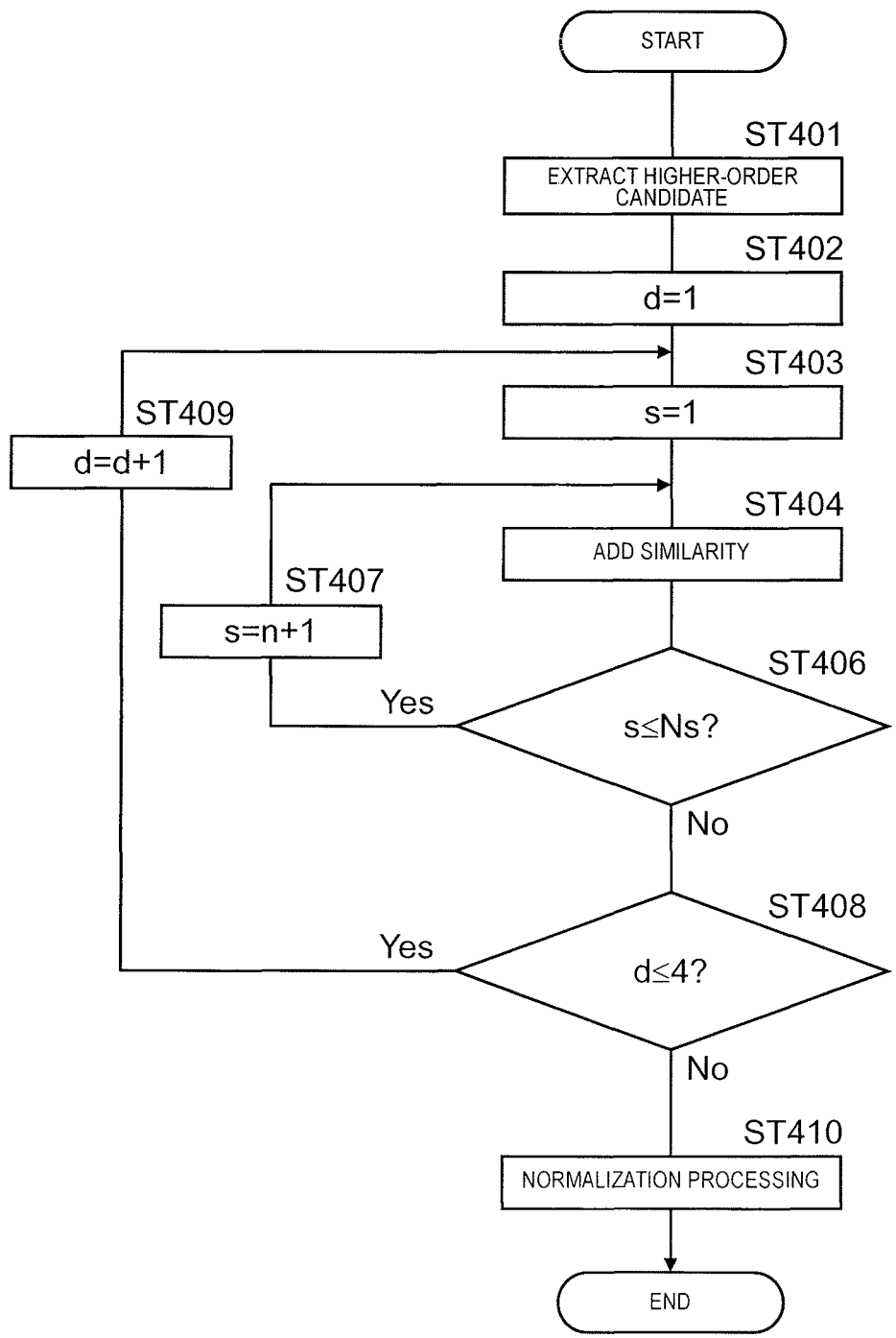
FIG. 17 is a flowchart illustrating details of step ST108 in FIG. 16.

FIG. 17 is a flowchart illustrating details of step ST308 in FIG. 16. In the similarity evaluation processing in this step ST308, first, with respect to the degree of similarity calculated in step ST305 in FIG. 16, a high-order candidate composed of a character string (here, series designation number) having a greater degree of similarity (maximum value) from a value to a number within a predetermined threshold value is extracted (ST401). Arrangement order d of the characters in the character string is set to 1 (d=1) (ST402), and the character number s is set to 1 (s=1) (ST403).

Here, arrangement order d of the characters relating to step ST402 is set according to the arrangement of characters in the identification medium (license plate) image. Here, the order corresponds to the digit of the series designation number (any of the 1 digit to the 4 digits). Even in a case where characters or the like other than numeric characters are included the character string to be recognized, the arrangement order is determined according to the position of the character in the identification medium (license plate) image or the relative position between these characters. For example, in a case where character strings are displayed in one array in the right and left direction in the identification medium (license plate) image, the arrangement number of the character positioned at the rightmost side is set to 1, and set arrangement numbers 2, 3, . . . •X toward the left, (where x is an integer).

Character number s relating to step ST403 is the type of characters positioned in the predetermined character arrangement order. Here the character number corresponds to the numeric character of each digit. In a case where the character string to be recognized includes characters other than numeric characters, for example, it is possible to set character number s based on a character code.

In the arrangement order of the characters set in step ST402, the similarity of all the character strings (strings extracted in ST401) including the characters matching the character number set in step ST403 is added (ST404). The addition result is sequentially stored in external storage device 4.

Thereafter, it is determined whether character number s is equal to or less than Ns (the total number of characters) (that is, whether or not the characters for which similarity addition has not been completed are left for each of all the characters in the predetermined arrangement order) (ST406). In a case where there is a character whose addition of similarity has not been completed (Yes), 1 is added to s (s=s+1) (ST407), and processing relating to the next character number is returned to step ST404. In a case where character number s finally exceeds Ns (ST406: No), it is determined whether arrangement order d is 4 or less (d≤4) (that is, whether the arrangement order d is equal to or less than the maximum value) (ST408).

In a case where an expression of d≤4 is satisfied (ST408: Yes), 1 is added to d (d=n+1) (ST409), and the processing returns to step ST403 to repeat the same processing as described above for the next digit (arrangement order). In a case where arrangement order d finally exceeds 4 (ST408: No), normalization processing is executed for each of the sums of similarities calculated in step ST404 (ST410), and the similarity evaluation process is terminated. As the normalization processing in step ST410, it is possible to execute, for example, a calculation of dividing each of the sums of similarities calculated in step ST404 by the number of high-order candidates extracted in step ST401.

By such similarity evaluation processing, evaluation values as illustrated in FIG. 14 are calculated and are output to display 5 and stored in external storage device 4. Furthermore, as described above, identification medium recognition device 3 can determine at least one character candidate that can configure a character string in the identification medium (license plate) image based on the evaluation value, and can output the candidate on display 5 and stores the candidate in external storage device 4. Identification medium recognition device 3 outputs the character candidate based on such evaluation value and the high-order candidate of the character string in the identification medium (license plate) image based on the similarity as illustrated in FIG. 13 on display 5.

Identification medium recognition system 1 according to the fifth exemplary embodiment can be applied not only to the license plate of the vehicle but also to ID authentication in various other uses of a case where the personal authentication by recognizing the ID card attached on the person's body at security gate 82 described in the fourth exemplary embodiment.

Sixth Exemplary Embodiment

Identification medium recognition system 1 according to a sixth exemplary embodiment of the present disclosure has the same function as identification medium recognition system 1 according to the fifth exemplary embodiment illustrated in FIG. 1A, FIG. 1B and FIG. 11 described above. However, in the fifth embodiment described above, similarity calculator 136 calculates the similarity of the entire character string (series designation number). However, in the sixth embodiment, similarity calculator 136 calculates the similarity between the character strings (configured of at least a plurality of characters). Regarding the sixth exemplary embodiment, matters which are not particularly mentioned below are the same as those of the above fifth embodiment.

FIGS. 18 and 19 are diagrams illustrating an example (upper two digits and lower two digits) of a calculation result by similarity calculator 136 of identification medium recognition device 3 according to a sixth exemplary embodiment of the present disclosure, respectively. FIG. 20 is a diagram illustrating an example of the calculation result of the evaluation value of each digit by similarity evaluator 137 of the identification medium recognition device.

In the sixth exemplary embodiment, as illustrated in FIGS. 18 and 19, similarity calculator 136 calculates the correlation value between the upper two digits ("••" to "99") and the lower two digits ("•1" to "99" and "00" to "09") of the series designation number, respectively.

Thereafter, similarity evaluator 137 extracts a series designation number (upper 2 digits) whose order of magnitude of the correlation value is within the threshold value, based on the correlation value illustrated in FIG. 18. Furthermore, for the numeric character of each digit to be evaluated in the series designation number (upper 2 digits), the sum of the similarities for the series designation number (upper 2 digits) including the same numeric character is calculated, and the sum is divided by the number of extraction of the series designation number as an evaluation value. In this manner, similarity evaluator 137 can acquire the evaluation value for each of the upper 2 digits of numeric character as illustrated in FIG. 20. The detailed explanation is omitted. However, in the same manner, similarity evaluator 137 can obtain the evaluation value of each numeric character of lower 2 digits based on the correlation value illustrated in FIG. 20.

Identification medium recognition system 1 according to the sixth exemplary embodiment can be applied not only to the license plate of the vehicle but also to ID authentication in various other uses such as the case of performing individual authentication by recognizing the ID card worn by a person at security gate 82 described in the fourth exemplary embodiment.

According to the identification medium recognition device of the present disclosure, since it is configured so as to select execution of super-resolution processing in a case where the region of the identification medium in the captured image is positioned within the preset region in the captured image, execution and non-execution of the super-resolution processing can be selected based on the position of the region of the identification medium in the captured image. Accordingly, by setting the region of the identification medium image imaged at the long distance, that is, a region where the region size in the captured image becomes smaller as a "preset region in the captured image", the identification medium image imaged at the long distance can be subjected to super-resolution processing. Therefore, it is possible to recognize both the identification medium image imaged at the long distance and the identification medium image imaged at the short distance without increasing a processing load of the device.

According to the identification medium recognition device of the present disclosure, since it is configured so as to select execution and non-execution of super-resolution processing based on at least one of the region size and a distortion degree of the region of the identification medium, it is possible to select execution and non-execution of super-resolution processing based on at least one of the region size and a distortion degree of the region of the identification medium. Therefore, by detecting the region of the identification medium image imaged at the long distance based on at least one of the degree of distortion and the region size, it is possible to perform super-resolution processing of the identification medium image imaged at the long distance. Accordingly, it possible to recognize both the identification medium image imaged at the short distance and the identification medium image imaged at the long distance without increasing the processing load of the device.

According to the identification medium recognition device of the present disclosure, since in a case where an r evaluation value exceeds a predetermined value, and the region size is below the preset value, it is configured to select the execution of super-resolution processing, it is possible to detect the region of the identification medium image imaged at the long distance based on the distortion degree and the region size of the region of the identification medium.

According to the identification medium recognition device of the present disclosure, for the reference characters respectively included in the plurality of reference images corresponding to 1 or y characters in the arrangement order to be evaluated in the character string in the identification medium image, since the evaluation value including the sum of similarities is calculated for each reference image with the same reference characters and at least one candidate character that can constitute a character string in the license plate image is determined based on the evaluation value, it is possible to reduce erroneous recognition of the character string in the imaged identification medium image.

According to the identification medium recognition device of the present disclosure, in the calculation of the evaluation value, it is possible to obtain a more appropriate evaluation value by excluding the reference image having a relatively low similarity.

According to the identification medium recognition device of the present disclosure, by calculating the evaluation value including the sum of similarity for each reference image in which a plurality of adjacent reference characters are the same, the calculation processing of the evaluation value becomes easy.

According to the identification medium recognition device of the present disclosure, by focusing on one character included in the character string, the similarity of individual characters is appropriately evaluated, and a more appropriate evaluation value can be acquired.

According to the identification medium recognition device of the present disclosure, since the evaluation value is calculated with respect to all the arrangement orders, it is possible to appropriately determine the candidates of all the characters that can constitute the character string in the license plate image.

According to the identification medium recognition device of the present disclosure, it is possible to acquire an appropriate evaluation value by a simple process by using the correlation coefficient as the similarity.

According to the identification medium recognition device of the present disclosure, the user can easily estimate the character string in the license plate image with reference to at least one character candidate based on the evaluation value and the character string candidate based on the similarity.

Although the present disclosure has been described based on specific exemplary embodiments, these exemplary embodiment are merely examples, and the present disclosure is not limited by these exemplary embodiment. The various components of the identification medium recognition device and the identification medium recognition method according to the present disclosure described above exemplary embodiments are not necessarily indispensable for the present disclosure, but may be omitted in a selective manner without departing from the range of the present disclosure.

INDUSTRIAL APPLICABILITY

The identification medium recognition device and the identification medium recognition method according to the present disclosure are useful as an identification medium recognition device and an identification medium recognition method capable of recognizing both the identification medium image imaged at the long distance and the identification medium image imaged at the short distance can be recognized without increasing a processing load of the device.

REFERENCE MARKS IN THE DRAWINGS

1 IDENTIFICATION MEDIUM RECOGNITION SYSTEM
2 IMAGING DEVICE
3 IDENTIFICATION MEDIUM RECOGNITION DEVICE
4 EXTERNAL STORAGE DEVICE
5 DISPLAY
11 IMAGE INPUT
12 IDENTIFICATION MEDIUM REGION DETECTOR
13 IDENTIFICATION MEDIUM REGION DETERMINER
14 REGION INFORMATION STORAGE
15 IDENTIFICATION MEDIUM IMAGE EXTRACTOR
16 SUPER-RESOLUTION PROCESSING SELECTOR
17 SUPER-RESOLUTION PROCESSOR
18 IDENTIFICATION MEDIUM RECOGNIZER
121 PROCESSOR
124 INPUT DEVICE
125 INPUT AND OUTPUT BUS
131 REFERENCE IMAGE GENERATOR
132 PROJECTIVE TRANSFORMATION MATRIX ACQUISITION UNIT
133 PROJECTIVE TRANSFORMATION PROCESSOR
134 IMAGE DETERIORATION PROCESSOR
136 SIMILARITY OPERATOR
137 SIMILARITY EVALUATOR

The invention claimed is:

1. An identification medium recognition device for recognizing at least one of a character or a numeric character included in an identification medium, the identification medium recognition device comprising:
a processor; and
a memory including a program that, when executed by the processor, causes the processor to perform operations including:
acquiring a captured image imaged by a camera;
detecting a region of the identification medium in the captured image;
recognizing the at least one of the character or the numeric character included in the identification medium;
storing a predetermined area, the predetermined area being identified in the captured image;
determining whether the region of the identification medium is positioned within the predetermined area;
selectively performing, in a first case where the region of the identification medium is determined to be positioned within the predetermined area, super-resolution processing of the region of the identification medium; and
selectively not performing, in a second case where the region of the identification medium is determined to not be positioned within the predetermined area, the super-resolution processing of the region of the identification medium.

2. The identification medium recognition device of claim 1, further comprising:
the camera for imaging a license plate image.

3. The identification medium recognition device of claim 1, wherein the operations further include:
storing at least one second predetermined area, the at least one second predetermined area being identified in the captured image;
determining whether the region of the identification medium is positioned within the at least one second predetermined area; and
selectively not performing, in a third case where the region of the identification medium is determined to be positioned within the at least one second predetermined area, the super-resolution processing of the region of the identification medium.

4. The identification medium recognition device of claim 3, wherein the at least one second predetermined area is closer to the camera than the predetermined area.

5. The identification medium recognition device of claim 1, wherein the captured image further includes at least one second predetermined area, the at least one second predetermined area is closer to the camera than the predetermined area, and the super-resolution processing of the region of the identification medium is not performed in a case where the region of the identification medium is positioned within the at least one second predetermined area.

6. The identification medium recognition device of claim 5, wherein the predetermined area and the at least one second predetermined area each comprise a driving lane.

7. The identification medium recognition device of claim 1, wherein
the identification medium in the captured image includes a license plate, and
the predetermined area in the captured image includes a driving lane.

8. The identification medium recognition device of claim 7, wherein
the captured image includes a plurality of driving lanes, the driving lane being one of the plurality of driving lanes,
a second driving lane of the plurality of driving lanes is not included in the predetermined area, and
the driving lane is farther from the camera than the second driving lane.

9. An identification medium recognition method for recognizing at least one of a character or a numeric character included in an identification medium, the identification medium recognition method comprising:
acquiring a captured image imaged by a camera;
detecting a region of the identification medium in the captured image;
recognizing the at least one of the character or the numeric character included in the identification medium;
storing a predetermined area, the predetermined area being identified in the captured image;
determining whether the region of the identification medium is positioned within the predetermined area;
selectively performing, in a first case where the region of the identification medium is determined to be positioned within the predetermined area, super-resolution processing of the region of the identification medium; and
selectively not performing, in a second case where the region of the identification medium is determined to not be positioned within the predetermined area, the super-resolution processing of the region of the identification medium.

10. An identification medium recognition method for recognizing at least one of a character or a numeric character included in an identification medium, the identification medium recognition method comprising:
acquiring a captured image imaged by a camera;
detecting a region of the identification medium in the captured image;
recognizing the at least one of the character or the numeric character included in the identification medium;
storing a predetermined area, the predetermined area being identified in the captured image;
determining whether the region of the identification medium is positioned within the predetermined area; and
selectively performing, in a case where the region of the identification medium is determined to be positioned within the predetermined area, super-resolution processing of the region of the identification medium, wherein a character string includes the at least one of the character or the numeric character included in the identification medium and is configured of a plurality of characters, in which an arrangement order from 1 to x is set according to positions or relative positions between the plurality of characters in the captured image,
similarities between the character string in the captured image and a plurality of preset reference images are calculated,
for a reference character in each of the plurality of the preset reference images corresponding to 1 or y characters in the arrangement order to be evaluated in the character string, an evaluation value including a sum of the similarities for each of the reference images in which the reference character is same is calculated,
at least one character candidate from which the character string in the captured image is configured is determined based on the evaluation value,
x is an integer of at least two, and
y is an integer of at least two and is less than x.

11. An identification medium recognition device for recognizing at least one of a character or a numeric character included in an identification medium, the identification medium recognition device comprising:
a processor; and
a memory including a program that, when executed by the processor, causes the processor to perform operations including:
acquiring a captured image imaged by a camera;
detecting a region of the identification medium in the captured image;
recognizing the at least one of the character or the numeric character included in the identification medium;
storing a predetermined area, the predetermined area being identified in the captured image;
determining whether the region of the identification medium is positioned within the predetermined area; and
selectively performing, in a case where the region of the identification medium is determined to be positioned within the predetermined area, super-resolution processing of the region of the identification medium,
wherein the operations further include:
recognizing a character string in a captured license plate image,
the character string includes the at least one of the character or the numeric character included in the identification medium and is configured of a plurality of characters, in which an arrangement order from 1 to x is set according to positions or relative positions between the plurality of characters in the captured image,
the processor
calculates similarities between the character string in the captured image and a plurality of preset reference images, respectively,
calculates, for a reference character in each of the plurality of the preset reference images corresponding to 1 or y characters in the arrangement order to be evaluated in the character string, an evaluation value including a sum of the similarities for each of the reference images in which the reference character is same, and determines at least one character candidate from which the character string in the captured image is configured based on the evaluation value, x is an integer of at least two, and y is an integer of at least two and is less than x.

12. The identification medium recognition device of claim 11, wherein the processor calculates the evaluation value using only similarities from a higher similarity among the plurality of similarities to a number within a predetermined threshold value.

13. The identification medium recognition device of claim 11, wherein the reference character corresponds to y and is continuous in the arrangement order.

14. The identification medium recognition device of claim 11, wherein the reference character is formed of one character.

15. The identification medium recognition device of claim 14, wherein the processor calculates, for each arrangement order, the evaluation value including the sum of the similarities for each of the reference images for which the reference character is the same.

16. The identification medium recognition device of claim 11, wherein the similarities include a correlation coefficient between the character string in the captured image and the reference image.

17. The identification medium recognition device of claim 11, further comprising: a display that displays the at least one character candidate and the character string, wherein the processor determines the at least one character candidate of the character string in the captured image based on the similarities.

* * * * *